US012675670B2

(12) United States Patent (10) Patent No.: US 12,675,670 B2
Ajay et al. (45) Date of Patent: Jul. 7, 2026

(54) OFFLINE PRIMITIVE DISCOVERY FOR ACCELERATING DATA-DRIVEN REINFORCEMENT LEARNING

(71) Applicant: Google LLC, Mountain View, CA (US)

(72) Inventors: Anurag Ajay, Cambridge, MA (US);
Ofir Nachum, San Francisco, CA (US);
Aviral Kumar, Berkeley, CA (US);
Sergey Levine, Berkeley, CA (US)

(73) Assignee: Google LLC, Mountain View, CA (US)

( * ) Notice: Subject to any disclaimer, the term of this patent is extended or adjusted under 35 U.S.C. 154(b) by 727 days.

(21) Appl. No.: 18/044,852

(22) PCT Filed: Sep. 23, 2021

(86) PCT No.: PCT/US2021/071562
§ 371 (c)(1),
(2) Date: Mar. 10, 2023

(87) PCT Pub. No.: WO2022/072982
PCT Pub. Date: Apr. 7, 2022

(65) Prior Publication Data
US 2023/0367996 A1 Nov. 16, 2023

Related U.S. Application Data

(60) Provisional application No. 63/086,986, filed on Oct. 2, 2020.

(51) Int. Cl.
*G06N 3/0455* (2023.01)
*G06N 3/092* (2023.01)

(52) U.S. Cl.
CPC ........... *G06N 3/0455* (2023.01); *G06N 3/092* (2023.01)

(58) Field of Classification Search
CPC ............................. G06N 3/092; G06N 3/0455
See application file for complete search history.

(56) References Cited

PUBLICATIONS

Shankar, Tanmay, and Abhinav Gupta. "Learning robot skills with temporal variational inference." International Conference on Machine Learning. PMLR, 2020. (Year: 2020).*
Lynch, Corey, et al. "Learning latent plans from play." Conference on robot learning. Pmlr, 2020. (Year: 2020).*
(Continued)

*Primary Examiner* — Schyler S Sanks
(74) *Attorney, Agent, or Firm* — McDonnell Boehnen Hulbert & Berghoff LLP

(57) ABSTRACT
A method includes determining a first state associated with a particular task, and determining, by a task policy model, a latent space representation of the first state. The task policy model may have been trained to define, for each respective state of a plurality of possible states associated with the particular task, a corresponding latent space representation of the respective state. The method also includes determining, by a primitive policy model and based on the first state and the latent space representation of the first state, an action to take as part of the particular task. The primitive policy model may have been trained to define a space of primitive policies for the plurality of possible states associated with the particular task and a plurality of possible latent space representations. The method further includes executing the action to reach a second state associated with the particular task.

20 Claims, 11 Drawing Sheets

(56) References Cited

PUBLICATIONS

Achiam et al., "Constrained policy optimization," In Proceedings of the 34th International Conference on Machine Learning, JMLR. Org, 2017, vol. 70, pp. 22-31 (arXiv:1705.10528v1 May 30, 2017).

Atkeson et al., "No Falls, No Resets: Reliable Humanoid Behavior in the DARPA Robotics Challenge," In 2015 IEEE-RAS 15th International Conference on Humanoid Robots (Humanoids), IEEE, 2015, pp. 623-630.

Bacon et al., "The Option-Critic Architecture," arXiv:1609.05140v2, In Thirty-First AAAI Conference on Artificial Intelligence, 2017, 9 pages.

Brown et al., Superhuman AI for Multiplayer Poker, Science, 2019, pp. 885-890, v. 365, No. 6456.

Co-Reyes et al., "Self-Consistent Trajectory Autoencoder: Hierarchical Reinforcement Learning with Trajectory Embeddings," arXiv:1806.02813v1, Jun. 7, 2018, 11 pages.

Dasari et al., "RoboNet: Large-Scale Multi-Robot Learning," arXiv:1910.11215v2, Jan. 2, 2020, 15 pages.

Dulac-Arnold et al., "Challenges of Real-World Reinforcement Learning," arXiv:1904.12901v1, Apr. 29, 2019, 13 pages.

Eysenbach et al., "Diversity is All You Need: Learning Skills without a Reward Function," arXiv:1802.06070V6, Oct. 9, 2018, 22 pages.

Fu et al., "D4RL: Datasets for Deep Data-Driven Reinforcement Learning," arXiv:2004.07219v4, Feb. 6, 2021, 19 pages.

Fujimoto et al., "Off-Policy Deep Reinforcement Learning without Exploration," arXiv:1812.02900v3, Aug. 10, 2019, 23 pages.

Haarnoja et al., "Soft Actor-Critic: Off-Policy Maximum Entropy Deep Reinforcement Learning with a Stochastic Actor," arXiv:1801.01290v2, Aug. 8, 2018, 14 pages.

Hausman et al., "Learning an Embedding Space for Transferable Robot Skills," In International Conference on Learning Representations (ICLR), 2018, 16 pages.

Higgins et al., "Beta-VAE: Learning Basic Visual Concepts with a Constrained Variational Framework," In International Conference on Learning Representations (ICLR), Nov. 4, 2016, 13 pages.

Jabri et al., "Unsupervised Curricula for Visual Meta-Reinforcement Learning," In Advances in Neural Information Processing Systems, 2019, pp. 10519-10531 (arXiv:1912.04226v1).

Jaques et al., "Way Off-Policy Batch Deep Reinforcement Learning of Implicit Human Preferences in Dialog," arXiv:1907.00456v2, Jul. 8, 2019, 16 pages.

Kamyar et al., "EMaQ: Expected-Max Q-Learning Operator for Simple Yet Effective Offline and Online RL," arXiv:2007.11091v2, Jan. 13, 2021, 28 pages.

Kingma et al., "Adam: A Method for Stochastic Optimization," arXiv:1412.6980v9, Jan. 30, 2017, 15 pages.

Krishnan et al., "DDCO: Discovery of Deep Continuous Options for Robot Learning from Demonstrations," arXiv:1710.05421v2, Oct. 31, 2017, 21 pages.

Kumar et al., Learning Navigation Subroutines from Egocentric Videos, In Conference on Robot Learning, PMLR, 2020, pp. 617-626 (arXiv:1905.12612v2).

Kumar et al., "Stabilizing Off-Policy Q-Learning via Bootstrapping Error Reduction," In Neural Information Processing Systems (NeurIPS), arXiv:1906.00949v2, Nov. 25, 2019, 19 pages.

Kumar et al., "Conservative Q-Learning for Offline Reinforcement Learning," arXiv:2006.04779v3, Aug. 19, 2020, 31 pages.

Levine et al., "End-to-End Training of Deep Visuomotor Policies," Journal of Machine Learning Research, 2016, pp. 1334-1373, vol. 17, No. 1.

Levine et al., "Offline Reinforcement Learning: Tutorial, Review, and Perspectives on Open Problems," arXiv:2005.01643v3, Nov. 1, 2020, 43 pages.

Lynch et al., "Learning Latent Plans from Play," In Conference on Robot Learning, 2020, pp. 1113-1132 (arXiv:1903.01973v2).

Matsushima et al., "Deployment-Efficient Reinforcement Learning via Model-Based Offline Optimization," arXiv:2006.03647v2, Jun. 23, 2020, 21 pages.

Merel et al., "Neural Probabilistic Motor Primitives for Humanoid Control," arXiv:1811.11711v2, (Conference Paper ICLR 2019) Jan. 15, 2019, 14 pages.

Nachum et al., "Near-Optimal Representation Learning for Hierarchical Reinforcement Learning," arXiv:1810.01257v2, (Conference Paper ICLR 2019) Jan. 9, 2019, 18 pages.

Nachum et al., "Data-Efficient Hierarchical Reinforcement Learning," In Advances in Neural Information Processing Systems, (arXiv:1805.08296v4), 2018, pp. 3303-3313.

Nachum et al., Multi-Agent Manipulation via Locomotion using Hierarchical Sim2Real. arXiv:1908.05224v2, Oct. 7, 2019, 14 pages.

Nachum et al., "Why Does Hierarchy (Sometimes) Work so Well in Reinforcement Learning?" arXiv:1909.10618v2, Dec. 30, 2019.

Parmas et al., "PIPPS: Flexible Model-Based Policy Search Robust to the Curse of Chaos," arXiv:1902.01240v1, Feb. 4, 2019, 10 pages.

Peng et al., "MCP: Learning Composable Hierarchical Control with Multiplicative Compositional Policies," (arXiv:1905.09808v1), In Advances in Neural Information Processing Systems, 2019, pp. 3686-3697.

Peters et al., "Relative Entropy Policy Search," Proceedings of the Twenty-Fourth AAAI Conference on Artificial Intelligence, 2010, pp. 1607-1612.

Pinto et al., "Supersizing Self-supervision: Learning to Grasp from 50k Tries and 700 Robot Hours," (arXiv:1509.06825v1), In 2016 IEEE international conference on robotics and automation (ICRA), IEEE, 2016, pp. 3406-3413.

Schulman et al., "Proximal Policy Optimization Algorithms," arXiv:1707.06347v2, Aug. 28, 2017, 12 pages.

Shankar et al., "Learning Robot Skills with Temporal Variational Inference," arXiv:2006.16232v1, Jun. 29, 2020, 13 pages (Published as a conference paper at ICLR 2021).

Sharma et al., "Dynamics-Aware Unsupervised Discovery of Skills," arXiv:1907.01657V2, Feb. 14, 2019 (Published as a conference paper at ICLR 2020), 21 pages.

Silver et al., "Mastering the game of Go with deep neural networks and tree search," Nature, 2016, pp. 484-489, vol. 529, No. 7587 (Abstract only).

Stolle et al., "Learning Options in Reinforcement Learning," Lecture Notes in Computer Science, 2002, pp. 212-223, vol. 2371, doi: 10.1007/3-540-45622-8.

Tesauro, Gerald, "Temporal Difference Learning and TD-Gammon," Communications of the ACM, Mar. 1995, 16 pages, vol. 38, No. 3.

Van Hasselt et al., "Deep Reinforcement Learning with Double Q-learning," arXiv:1509.06461v3, Dec. 8, 2015, 13 pages.

Vezhnevets et al., "FeUdal Networks for Hierarchical Reinforcement Learning," arXiv:1703.01161v2, Mar. 6, 2017, 12 pages.

Wang et al., "Robust Imitation of Diverse Behaviors," arXiv:1707.02747v2, In Advances in Neural Information Processing Systems, 2017, pp. 5320-5329.

Wu et al., "Behavior Regularized Offline Reinforcement Learning," arXiv:1911.11361v1, Nov. 26, 2019, 25 pages.

Yu et al., "Meta-World: A Benchmark and Evaluation for Multi-Task and Meta Reinforcement Learning," arXiv:1910.10897v2, In Conference on Robot Learning, 2020, pp. 1094-1100.

International Searching Authority, International Search Report and Written Opinion mailed Jan. 28, 2022, issued in connection with International Patent Application No. PCT/US2021/071562, filed Sep. 23, 2021, 22 pages.

Puterman, Martin L., Markov Decision Processes: Discrete Stochastic Dynamic Programming, Wiley, Aug. 2014 (Abstract Only).

* cited by examiner

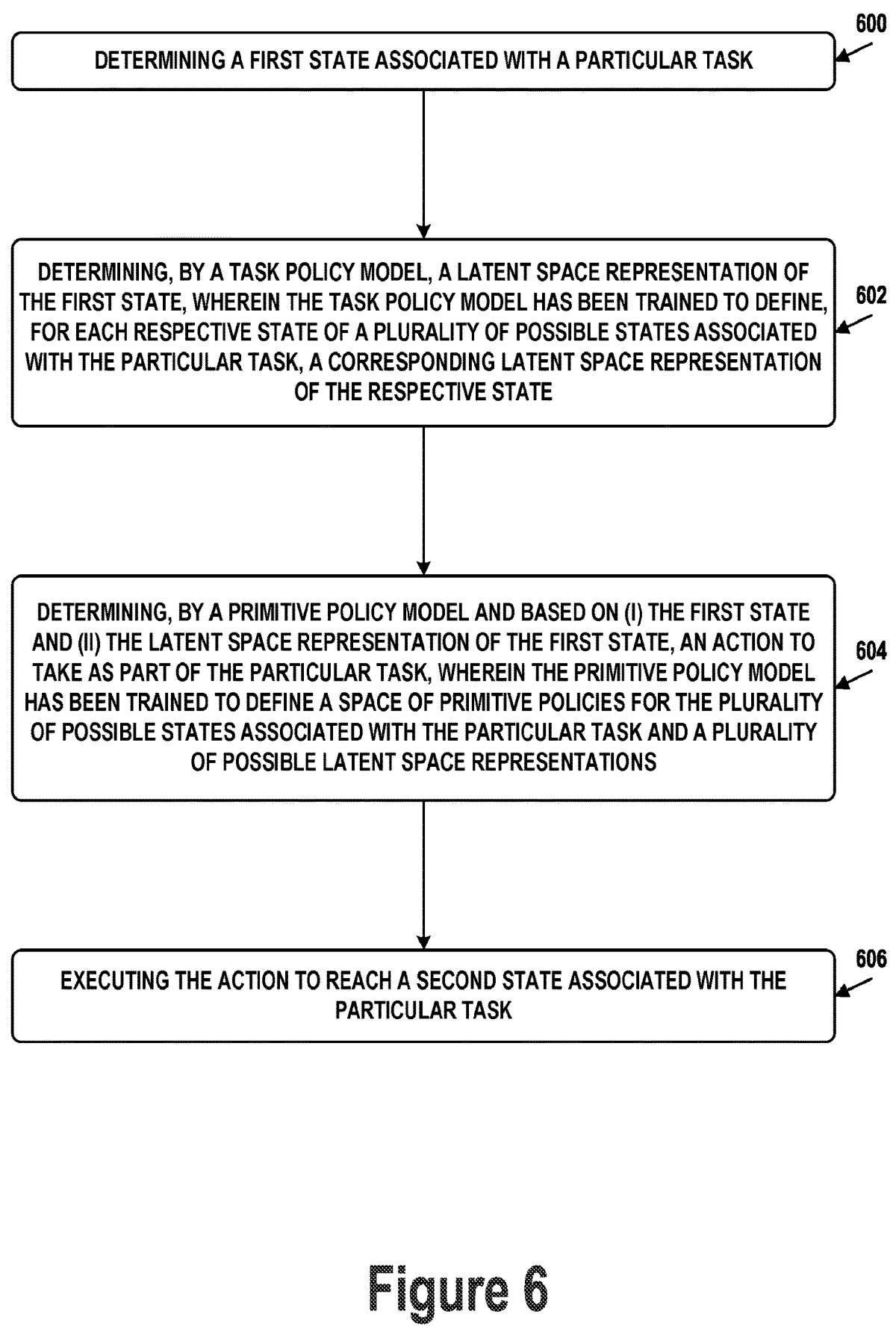

600

DETERMINING A FIRST STATE ASSOCIATED WITH A PARTICULAR TASK

602

DETERMINING, BY A TASK POLICY MODEL, A LATENT SPACE REPRESENTATION OF THE FIRST STATE, WHEREIN THE TASK POLICY MODEL HAS BEEN TRAINED TO DEFINE, FOR EACH RESPECTIVE STATE OF A PLURALITY OF POSSIBLE STATES ASSOCIATED WITH THE PARTICULAR TASK, A CORRESPONDING LATENT SPACE REPRESENTATION OF THE RESPECTIVE STATE

604

DETERMINING, BY A PRIMITIVE POLICY MODEL AND BASED ON (I) THE FIRST STATE AND (II) THE LATENT SPACE REPRESENTATION OF THE FIRST STATE, AN ACTION TO TAKE AS PART OF THE PARTICULAR TASK, WHEREIN THE PRIMITIVE POLICY MODEL HAS BEEN TRAINED TO DEFINE A SPACE OF PRIMITIVE POLICIES FOR THE PLURALITY OF POSSIBLE STATES ASSOCIATED WITH THE PARTICULAR TASK AND A PLURALITY OF POSSIBLE LATENT SPACE REPRESENTATIONS

606

EXECUTING THE ACTION TO REACH A SECOND STATE ASSOCIATED WITH THE PARTICULAR TASK

Figure 6

| ENVIRONMENT | BC | BEAR | EMAQ | CQL | SYSTEM 300 |
|---|---|---|---|---|---|
| ANTMAZE MEDIUM (DIVERSE) | 0.0 | 8.0 | 0.0 | 53.7 +/- 6.1 | 81.1 +/- 3.1 |
| ANTMAZE LARGE (DIVERSE) | 0.0 | 0.0 | 0.0 | 14.9 +/- 3.2 | 70.3 +/- 2.9 |
| KITCHEN MIXED | 47.5 | 47.2 | 70.8 +/- 2.3 | 52.4 +/- 2.5 | 69.3 +/- 2.7 |
| KITCHEN PARTIAL | 33.8 | 13.1 | 74.6 +/- 0.6 | 50.1 +/- 1.0 | 80.2 +/- 2.4 |

Figure 7A

| ENVIRONMENT | BC | BC + SVAE | SYSTEM 300 |
|---|---|---|---|
| ANTMAZE MEDIUM (DIVERSE) | 30.1 +/- 3.2 | 72.8 +/- 2.3 | 81.5 +/- 2.7 |
| ANTMAZE LARGE (DIVERSE) | 9.2 +/- 2.5 | 49.4 +/- 2.2 | 63.5 +/- 2.3 |

Figure 7B

| ENVIRONMENT | HIRO | SAC + BC | DDQN+DDCO | SYSTEM 300 |
|---|---|---|---|---|
| ANTMAZE MEDIUM SPARSE (DIVERSE) | 0.0 | 0.0 | 0.0 | 81.6 +/- 3.7 |
| ANTMAZE LARGE SPARSE (DIVERSE) | 0.0 | 0.0 | 0.0 | 0.0 |
| ANTMAZE MEDIUM DENSE (DIVERSE) | 47.5 | 0.0 | 0.0 | 81.3 +/- 3.3 |
| ANTMAZE LARGE DENSE (DIVERSE) | 12 | 0.0 | 0.0 | 81.5 +/- 3.9 |

Figure 7C

OFFLINE PRIMITIVE DISCOVERY FOR ACCELERATING DATA-DRIVEN REINFORCEMENT LEARNING

CROSS-REFERENCE TO RELATED APPLICATIONS

This application is a National Stage Application under 35 U.S.C. § 371 and claims priority to International Patent Application No. PCT/US2021/071562, filed Sep. 23, 2021, and titled "Offline Primitive Discovery For Accelerating Data-Driven Reinforcement Learning." which claims priority to U.S. Provisional Patent Application No. 63/086,986, filed on Oct. 2, 2020, and titled "Offline Primitive Discovery For Accelerating Data-Driven Reinforcement Learning," each of which is hereby incorporated by reference as if fully set forth in this description.

BACKGROUND

Reinforcement learning (RL) is an area of machine learning that focuses on how agents are to act in an environment in order to increase, maximize, and/or otherwise optimize a reward resulting from and/or associated with the agents' actions. Unlike supervised learning, RL may be performed without reliance on labeled training data. RL may involve a combination of exploration of uncharted territories and exploitation of current knowledge.

SUMMARY

A task policy model and a primitive policy model may be trained using reinforcement learning (RL) techniques to facilitate performance of a particular task by an agent. The task policy may operate as a high-level controller of the agent, and may be configured to generate a latent space representation of the agent's state. The latent space representation of the agent's state may be used by the primitive policy model, which may operate as a low-level controller of the agent, to generate actions for the agent for a predetermined number of time steps. An updated latent space representation may be generated based on a state reached by taking the actions for the predetermined number of time steps, and additional actions may be generated based on the updated latent space representation. The latent space representations may condition the primitive policy model to generate actions that are supported by a training dataset used to train the models for the particular task. Accordingly, the agent may take actions that are performable, feasible, safe, and/or natural as part of the particular task, and may thereby avoid moving into states with respect to which the models have not been trained, resulting in improved task performance.

In a first example embodiment, a method is provided that includes determining a first state associated with a particular task. The method also includes determining, by a task policy model, a latent space representation of the first state. The task policy model may have been trained to define, for each respective state of a plurality of possible states associated with the particular task, a corresponding latent space representation of the respective state. The method additionally includes determining, by a primitive policy model and based on (i) the first state and (ii) the latent space representation of the first state, an action to take as part of the particular task. The primitive policy model may have been trained to define a space of primitive policies for the plurality of possible states associated with the particular task and a plurality of possible latent space representations. The method further includes executing the action to reach a second state associated with the particular task.

In a second example embodiment, a system is provided comprising a processor and a non-transitory computer-readable medium having stored thereon instructions that, when executed by the processor, cause the processor to perform operations in accordance with the first example embodiment.

In a third example embodiment, a non-transitory computer-readable medium is provided having stored thereon instructions that, when executed by a computing device, cause the computing device to perform operations in accordance with the first example embodiment.

In a fourth example embodiment, a robotic device is provided that may be configured to perform operations in accordance with the first example embodiment.

In a fifth example embodiment, a system is provided that includes various means for carrying out each of the operations of the first example embodiment.

These, as well as other embodiments, aspects, advantages, and alternatives, will become apparent to those of ordinary skill in the art by reading the following detailed description, with reference where appropriate to the accompanying drawings. Further, this summary and other descriptions and figures provided herein are intended to illustrate embodiments by way of example only and, as such, that numerous variations are possible. For instance, structural elements and process steps can be rearranged, combined, distributed, eliminated, or otherwise changed, while remaining within the scope of the embodiments as claimed.

BRIEF DESCRIPTION OF THE DRAWINGS

FIG. 6 is a flowchart of a method, in accordance with examples described herein.

FIGS. 7A, 7B, and 7C include tables of performance results of various task performance systems trained using different RL systems, in accordance with examples described herein.

DETAILED DESCRIPTION

Figure 1:
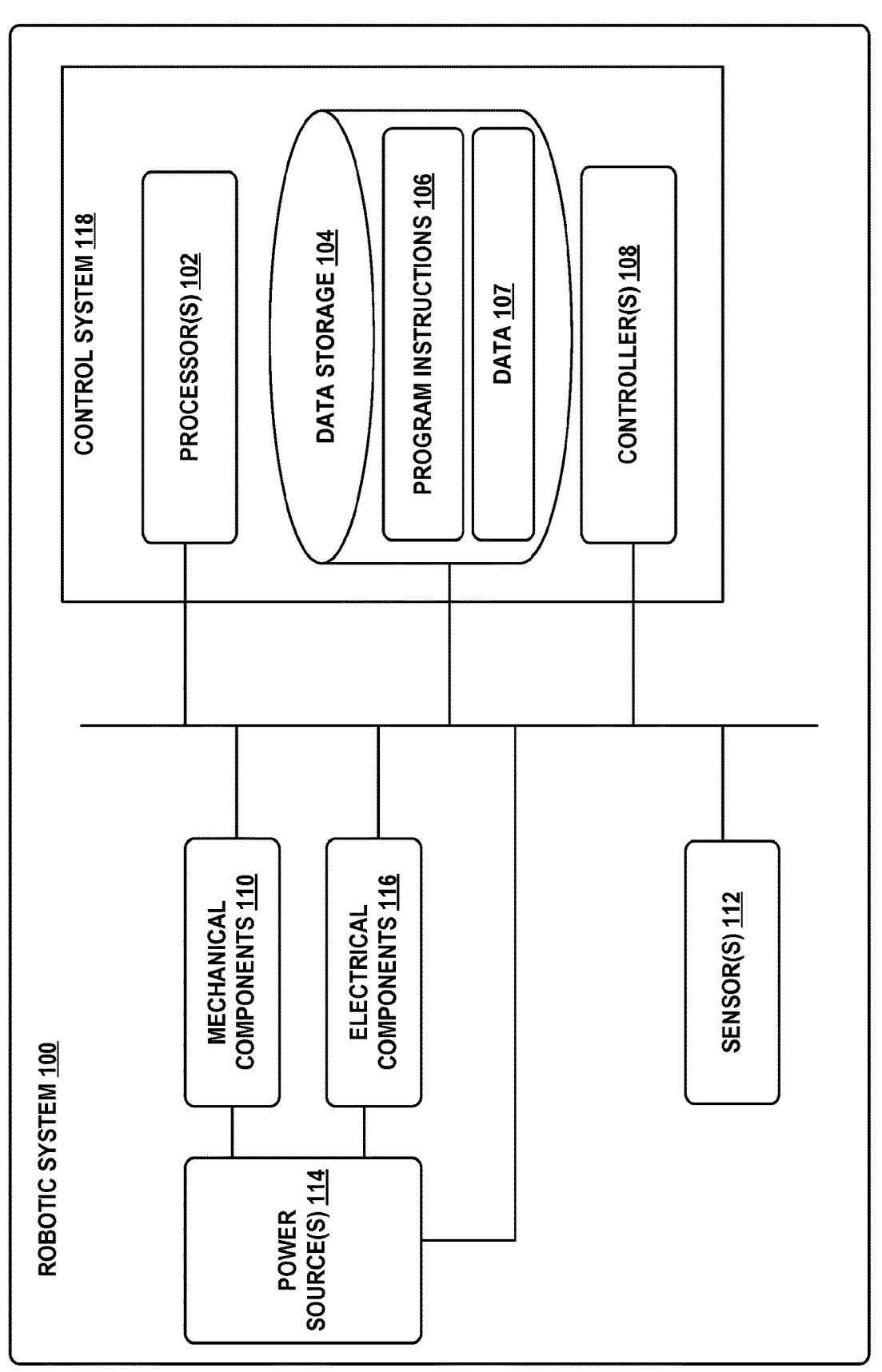
FIG. 1 is a block diagram of a robotic system, in accordance with examples described herein.

Example methods, devices, and systems are described herein. It should be understood that the words "example" and "exemplary" are used herein to mean "serving as an example, instance, or illustration." Any embodiment or feature described herein as being an "example," "exemplary," and/or "illustrative" is not necessarily to be construed as preferred or advantageous over other embodiments or features unless stated as such. Thus, other embodiments can be utilized and other changes can be made without departing from the scope of the subject matter presented herein.

Accordingly, the example embodiments described herein are not meant to be limiting. It will be readily understood that the aspects of the present disclosure, as generally described herein, and illustrated in the figures, can be arranged, substituted, combined, separated, and designed in a wide variety of different configurations.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order. Unless otherwise noted, figures are not drawn to scale.

I. Overview

A task policy model and a primitive policy model may be trained and used to facilitate performance of a particular task. Specifically, the task policy model and the primitive policy model may be trained using an RL process, such as offline RL, few-shot imitation RL, and/or online RL, among others. The task policy model may operate as a high-level controller that is configured to generate a latent space representation for part of the particular task, while the primitive policy model may operate as a low-level controller that is configured to generate actions for the particular task based on the latent space representation.

The task policy model and the primitive policy model may be trained based on undirected and/or unlabeled datasets generated prior to the training process. These datasets, which may be referred to as training datasets, may represent, for example, driving behavior of a vehicle (e.g., controlled by a human and/or an autonomous system), humans performing manual tasks, and/or robots performing tasks, among other possible tasks that are executable by various agents. Although such data may be undirected and/or unlabeled, it may nevertheless be useful in demonstrating natural behaviors that are performable within corresponding environments and/or as part of corresponding tasks.

The training dataset may be used to extract a continuous space of recurring and temporally extended primitive behaviors. This space may be parametrized by the primitive policy model, and samples from this continuous space of recurring and temporally extended primitives may be referred to as latent space representations. For example, a training dataset may represent an agent performing undirected navigation of a maze environment. While the training dataset might not provide demonstrations of any single specific point-to-point navigation, it may nevertheless present clear indications of what temporally extended behaviors are useful and natural in this maze environment (e.g., moving forward, left, right, and backward).

An unsupervised learning objective applied to the primitive policy model and/or the task policy model may extract these behaviors from the training dataset. Specifically, training of the task policy model and the primitive policy model may be facilitated by an encoder model and a prior model, among others. The encoder model may be configured to represent sub-trajectories of the training dataset in the latent space of primitive behaviors, while the primitive policy model may be used to reconstruct the sub-trajectories based on the latent space representations. An autoencoding loss function may be used to quantify a reconstruction quality of the sub-trajectories, and the encoder model and/or the primitive policy model may be iteratively refined based on a loss value generated by the loss function. The prior model may provide a further statistical constraint for the optimization.

Once these primitive behaviors are extracted in the form of a trained encoder model, a trained primitive policy model, and/or a trained prior model, they may be leveraged to accelerate a downstream learning process that trains the task policy model. For example, when a specific point-to-point navigation is commanded, the agent can leverage the learned primitives to solve the point-to-point navigation task, as opposed to learning locomotion and navigation from scratch. Thus, the learned primitives may (i) delineate behaviors that are supported by the training dataset from behaviors that are not (thus assisting with avoiding distributional shift) and (ii) and provide a degree of temporal abstraction which reduces the effective time horizon of learning to perform a task.

Specifically, an additional offline RL, few-shot RL, and/or online RL training process may be performed to train the task policy model to generate latent space representations that are usable by the trained primitive policy model. The resulting task policy model and primitive policy model may be specific to a task represented by the training dataset. Thus, the task policy model and the primitive policy model may be adapted to operate as part of different tasks by training on corresponding training datasets.

The learning process used to generate the task policy model and the primitive policy model may be referred to herein as Offline Primitives for Accelerating Reinforcement Learning (OPAL). OPAL may be applied to offline RL, few-shot imitation RL, and/or online RL, among other possibilities. In the case of offline RL, the agent may be given an offline dataset to use for both the initial unsupervised learning phase and the subsequent task-directed offline policy optimization phase. Despite the fact that no additional data is used, OPAL can improve offline policy optimization compared to performing offline policy optimization on the raw dataset directly. Notably, the method applied to offline datasets in this manner achieves state-of-the-art performance in difficult simulated robotic navigation environments, outperforming not only existing offline RL methods but also online RL algorithms applied to the same tasks. OPAL may also be incorporated as part of few-shot imitation learning and/or as a preprocessing step to standard online RL. In each of these settings, the use of OPAL can improve the speed and quality of downstream task learning.

II. Example Robotic System

FIG. 1 illustrates an example configuration of a robotic system that may be used in connection with the implementations described herein. Robotic system 100 may be configured to operate autonomously, semi-autonomously, or using directions provided by a user or users. Robotic system 100 may be implemented in various forms, such as a robotic arm, industrial robot, autonomous vehicle, unmanned aerial vehicle, or some other arrangement. Some example implementations involve a robotic system 100 engineered to be low cost at scale and designed to support a variety of tasks. Robotic system 100 may be designed to be capable of operating around people. Robotic system 100 may also be optimized for machine learning. Throughout this description, robotic system 100 may also be referred to as a robot, robotic device, or mobile robot, among other designations.

As shown in FIG. 1, robotic system 100 may include processor(s) 102, data storage 104, and controller(s) 108, which together may be part of control system 118. Robotic system 100 may also include sensor(s) 112, power source(s) 114, mechanical components 110, and electrical components 116. Nonetheless, robotic system 100 is shown for illustrative purposes, and may include more or fewer components. The various components of robotic system 100 may be connected in any manner, including wired or wireless connections. Further, in some examples, components of robotic system 100 may be distributed among multiple physical entities rather than a single physical entity. Other example illustrations of robotic system 100 may exist as well.

Processor(s) 102 may operate as one or more general-purpose hardware processors or special purpose hardware processors (e.g., digital signal processors, application specific integrated circuits, etc.). Processor(s) 102 may be configured to execute computer-readable program instructions 106, and manipulate data 107, both of which are stored in data storage 104. Processor(s) 102 may also directly or indirectly interact with other components of robotic system 100, such as sensor(s) 112, power source(s) 114, mechanical components 110, or electrical components 116.

Data storage 104 may be one or more types of hardware memory. For example, data storage 104 may include or take the form of one or more computer-readable storage media that can be read or accessed by processor(s) 102. The one or more computer-readable storage media can include volatile or non-volatile storage components, such as optical, magnetic, organic, or another type of memory or storage, which can be integrated in whole or in part with processor(s) 102. In some implementations, data storage 104 can be a single physical device. In other implementations, data storage 104 can be implemented using two or more physical devices, which may communicate with one another via wired or wireless communication. As noted previously, data storage 104 may include the computer-readable program instructions 106 and data 107. Data 107 may be any type of data, such as configuration data, sensor data, or diagnostic data, among other possibilities.

Controller 108 may include one or more electrical circuits, units of digital logic, computer chips, or microprocessors that are configured to (perhaps among other tasks), interface between any combination of mechanical components 110, sensor(s) 112, power source(s) 114, electrical components 116, control system 118, or a user of robotic system 100. In some implementations, controller 108 may be a purpose-built embedded device for performing specific operations with one or more subsystems of the robotic system 100.

Control system 118 may monitor and physically change the operating conditions of robotic system 100. In doing so, control system 118 may serve as a link between portions of robotic system 100, such as between mechanical components 110 or electrical components 116. In some instances, control system 118 may serve as an interface between robotic system 100 and another computing device. Further, control system 118 may serve as an interface between robotic system 100 and a user. In some instances, control system 118 may include various components for communicating with robotic system 100, including a joystick, buttons, or ports, etc. The example interfaces and communications noted above may be implemented via a wired or wireless connection, or both. Control system 118 may perform other operations for robotic system 100 as well.

During operation, control system 118 may communicate with other systems of robotic system 100 via wired or wireless connections, and may further be configured to communicate with one or more users of the robot. As one possible illustration, control system 118 may receive an input (e.g., from a user or from another robot) indicating an instruction to perform a requested task, such as to pick up and move an object from one location to another location. Based on this input, control system 118 may perform operations to cause the robotic system 100 to make a sequence of movements to perform the requested task. As another illustration, a control system may receive an input indicating an instruction to move to a requested location. In response, control system 118 (perhaps with the assistance of other components or systems) may determine a direction and speed to move robotic system 100 through an environment en route to the requested location.

Operations of control system 118 may be carried out by processor(s) 102. Alternatively, these operations may be carried out by controller(s) 108, or a combination of processor(s) 102 and controller(s) 108. In some implementations, control system 118 may partially or wholly reside on a device other than robotic system 100, and therefore may at least in part control robotic system 100 remotely.

Mechanical components 110 represent hardware of robotic system 100 that may enable robotic system 100 to perform physical operations. As a few examples, robotic system 100 may include one or more physical members, such as an arm, an end effector, a head, a neck, a torso, a base, and wheels. The physical members or other parts of robotic system 100 may further include actuators arranged to move the physical members in relation to one another. Robotic system 100 may also include one or more structured bodies for housing control system 118 or other components, and may further include other types of mechanical components. The particular mechanical components 110 used in a given robot may vary based on the design of the robot, and may also be based on the operations or tasks the robot may be configured to perform.

Robotic system 100 may include sensor(s) 112 arranged to sense aspects of robotic system 100. Sensor(s) 112 may include one or more force sensors, torque sensors, velocity sensors, acceleration sensors, position sensors, proximity sensors, motion sensors, location sensors, load sensors, temperature sensors, touch sensors, depth sensors, ultrasonic range sensors, infrared sensors, object sensors, or cameras, among other possibilities. Within some examples, robotic system 100 may be configured to receive sensor data from sensors that are physically separated from the robot (e.g., sensors that are positioned on other robots or located within the environment in which the robot is operating).

Sensor(s) 112 may provide sensor data to processor(s) 102 (perhaps by way of data 107) to allow for interaction of robotic system 100 with its environment, as well as monitoring of the operation of robotic system 100. The sensor data may be used in evaluation of various factors for activation, movement, and deactivation of mechanical components 110 and electrical components 116 by control system 118. For example, sensor(s) 112 may capture data corresponding to the terrain of the environment or location of nearby objects, which may assist with environment recognition and navigation.

In some examples, sensor(s) 112 may include RADAR (e.g., for long-range object detection, distance determination, or speed determination), LIDAR (e.g., for short-range object detection, distance determination, or speed determination), SONAR (e.g., for underwater object detection, distance determination, or speed determination), VICON® (e.g., for motion capture), one or more cameras (e.g., stereoscopic cameras for 3D vision), a global positioning system (GPS) transceiver, or other sensors for capturing information of the environment in which robotic system 100 is operating. Sensor(s) 112 may monitor the environment in real time, and detect obstacles, elements of the terrain, weather conditions, temperature, or other aspects of the environment. In another example, sensor(s) 112 may capture data corresponding to one or more characteristics of a target or identified object, such as a size, shape, profile, structure, or orientation of the object.

Further, robotic system 100 may include sensor(s) 112 configured to receive information indicative of the state of robotic system 100, including sensor(s) 112 that may monitor the state of the various components of robotic system 100. Sensor(s) 112 may measure activity of systems of robotic system 100 and receive information based on the operation of the various features of robotic system 100, such as the operation of an extendable arm, an end effector, or other mechanical or electrical features of robotic system 100. The data provided by sensor(s) 112 may enable control system 118 to determine errors in operation as well as monitor overall operation of components of robotic system 100.

As an example, robotic system 100 may use force/torque sensors to measure load on various components of robotic system 100. In some implementations, robotic system 100 may include one or more force/torque sensors on an arm or end effector to measure the load on the actuators that move one or more members of the arm or end effector. In some examples, the robotic system 100 may include a force/torque sensor at or near the wrist or end effector, but not at or near other joints of a robotic arm. In further examples, robotic system 100 may use one or more position sensors to sense the position of the actuators of the robotic system. For instance, such position sensors may sense states of extension, retraction, positioning, or rotation of the actuators on an arm or end effector.

As another example, sensor(s) 112 may include one or more velocity or acceleration sensors. For instance, sensor(s) 112 may include an inertial measurement unit (IMU). The IMU may sense velocity and acceleration in the world frame, with respect to the gravity vector. The velocity and acceleration sensed by the IMU may then be translated to that of robotic system 100 based on the location of the IMU in robotic system 100 and the kinematics of robotic system 100.

Robotic system 100 may include other types of sensors not explicitly discussed herein. Additionally or alternatively, the robotic system may use particular sensors for purposes not enumerated herein.

Robotic system 100 may also include one or more power source(s) 114 configured to supply power to various components of robotic system 100. Among other possible power systems, robotic system 100 may include a hydraulic system, electrical system, batteries, or other types of power systems. As an example illustration, robotic system 100 may include one or more batteries configured to provide charge to components of robotic system 100. Some of mechanical components 110 or electrical components 116 may each connect to a different power source, may be powered by the same power source, or be powered by multiple power sources.

Any type of power source may be used to power robotic system 100, such as electrical power or a gasoline engine. Additionally or alternatively, robotic system 100 may include a hydraulic system configured to provide power to mechanical components 110 using fluid power. Components of robotic system 100 may operate based on hydraulic fluid being transmitted throughout the hydraulic system to various hydraulic motors and hydraulic cylinders, for example. The hydraulic system may transfer hydraulic power by way of pressurized hydraulic fluid through tubes, flexible hoses, or other links between components of robotic system 100. Power source(s) 114 may charge using various types of charging, such as wired connections to an outside power source, wireless charging, combustion, or other examples.

Electrical components 116 may include various mechanisms capable of processing, transferring, or providing electrical charge or electric signals. Among possible examples, electrical components 116 may include electrical wires, circuitry, or wireless communication transmitters and receivers to enable operations of robotic system 100. Electrical components 116 may interwork with mechanical components 110 to enable robotic system 100 to perform various operations. Electrical components 116 may be configured to provide power from power source(s) 114 to the various mechanical components 110, for example. Further, robotic system 100 may include electric motors. Other examples of electrical components 116 may exist as well.

Robotic system 100 may include a body, which may connect to or house appendages and components of the robotic system. As such, the structure of the body may vary within examples and may further depend on particular operations that a given robot may have been designed to perform. For example, a robot developed to carry heavy loads may have a wide body that enables placement of the load. Similarly, a robot designed to operate in tight spaces may have a relatively tall, narrow body. Further, the body or the other components may be developed using various types of materials, such as metals or plastics. Within other examples, a robot may have a body with a different structure or made of various types of materials.

Robotic system 100 may be configured to carry a load, such as a type of cargo that is to be transported. In some examples, the load may be placed by the robotic system 100 into a container attached to the robotic system 100. The load may also represent external batteries or other types of power sources (e.g., solar panels) that the robotic system 100 may utilize. Carrying the load represents one example use for which the robotic system 100 may be configured, but the robotic system 100 may be configured to perform other operations as well.

As noted above, robotic system 100 may include various types of appendages, wheels, end effectors, gripping devices and so on. In some examples, robotic system 100 may include a mobile base with wheels, treads, or some other form of locomotion. Additionally, robotic system 100 may include a robotic arm or some other form of robotic manipulator. In the case of a mobile base, the base may be considered as one of mechanical components 110 and may include wheels, powered by one or more actuators, which allow for mobility of a robotic arm in addition to the rest of the body.

III. Example Machine Learning Architecture

Figure 2:
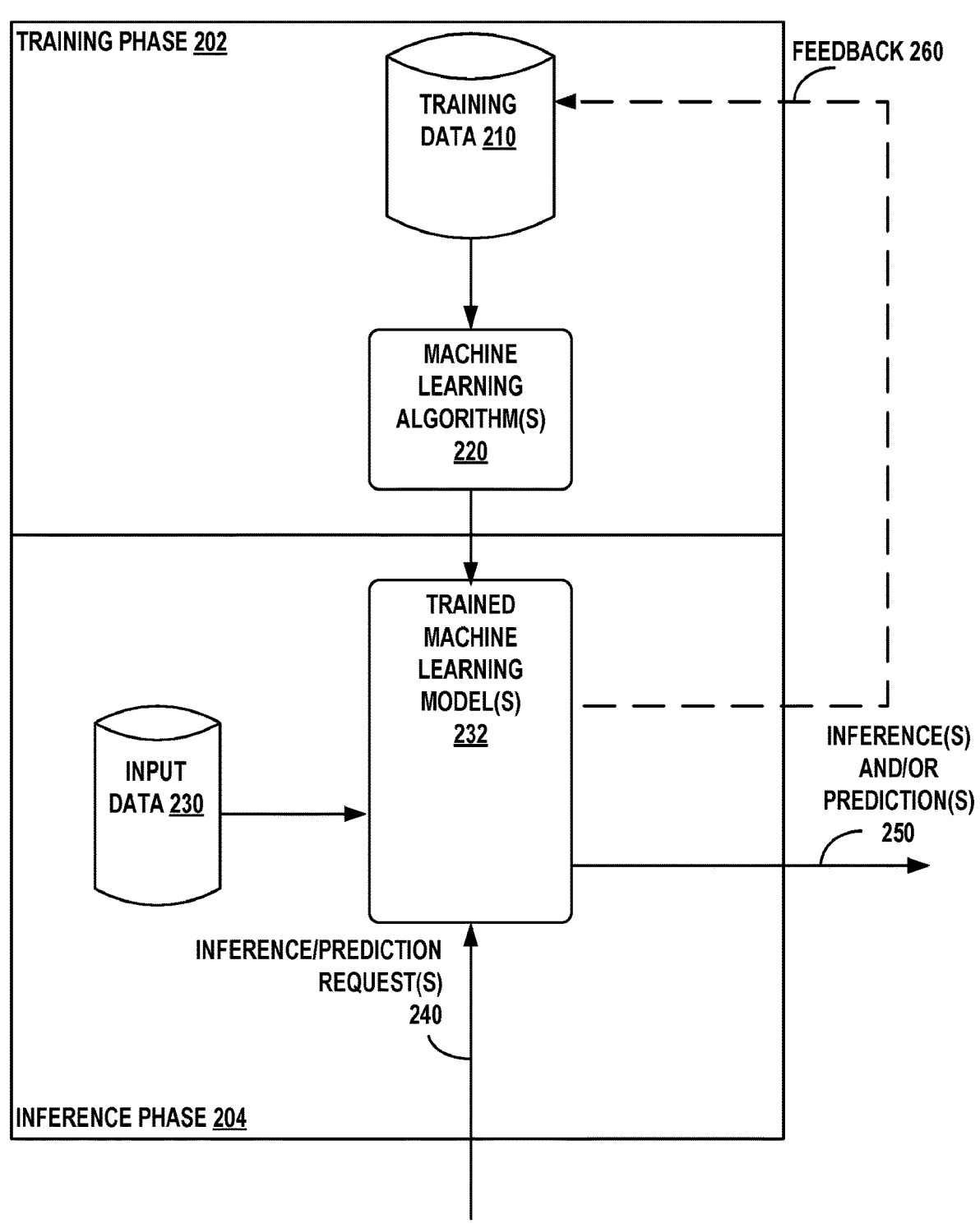
FIG. 2 is a diagram illustrating training and inference phases of a machine learning model, in accordance with examples described herein.

Robotic system 100 or a different type of computing device used in connection with the implementations described herein may be configured using one or more machine learning models. FIG. 2 shows diagram 200 illustrating a training phase 202 and an inference phase 204 of trained machine learning model(s) 232, in accordance with example embodiments. Some machine learning techniques involve training one or more machine learning algorithms on an input set of training data to recognize patterns in the training data and provide output inferences and/or predictions about patterns in the training data. The resulting trained machine learning algorithm can be termed as a trained machine learning model.

For example, FIG. 2 shows training phase 202 where one or more machine learning algorithms 220 are being trained on training data 210 to become trained machine learning model(s) 232. Feedback 260 may be generated during training phase 202 and used to assist in generating trained machine learning model(s) 232. Then, during inference phase 204, trained machine learning model 232 can receive input data 230 and one or more inference/prediction requests 240 (perhaps as part of input data 230) and responsively provide as an output one or more inferences and/or predictions 250.

As such, trained machine learning model(s) 232 can include one or more models of one or more machine learning algorithms 220. Machine learning algorithm(s) 220 may include, but are not limited to: an artificial neural network (e.g., a convolutional neural network, a recurrent neural network, a Bayesian network, a hidden Markov model, a Markov decision process, a logistic regression function, a support vector machine, a suitable statistical machine learning algorithm, and/or a heuristic machine learning system). Machine learning algorithm(s) 220 may be supervised or unsupervised, and may implement any suitable combination of online and offline learning.

In some examples, machine learning algorithm(s) 220 and/or trained machine learning model(s) 232 can be accelerated using on-device coprocessors, such as graphic processing units (GPUs), tensor processing units (TPUs), digital signal processors (DSPs), and/or application specific integrated circuits (ASICs). Such on-device coprocessors can be used to speed up machine learning algorithm(s) 220 and/or trained machine learning model(s) 232. In some examples, trained machine learning model(s) 232 can be trained, stored, and executed to provide inferences on a particular computing device, and/or otherwise can make inferences for the particular computing device.

During training phase 202, machine learning algorithm(s) 220 can be trained by providing at least training data 210 as training input using unsupervised, supervised, semi-supervised, and/or reinforcement learning techniques. Unsupervised learning involves providing a portion (or all) of training data 210 to machine learning algorithm(s) 220 and machine learning algorithm(s) 220 determining one or more output inferences based on the provided portion (or all) of training data 210. Supervised learning involves providing a portion of training data 210 to machine learning algorithm(s) 220, with machine learning algorithm(s) 220 determining one or more output inferences based on the provided portion of training data 210, and the output inference(s) are either accepted or corrected based on correct results associated with training data 210. In some examples, supervised learning of machine learning algorithm(s) 220 can be governed by a set of rules and/or a set of labels for the training input, and the set of rules and/or set of labels may be used to correct inferences of machine learning algorithm(s) 220.

Semi-supervised learning involves having correct results for part, but not all, of training data 210. During semi-supervised learning, supervised learning is used for a portion of training data 210 having correct results, and unsupervised learning is used for a portion of training data 210 not having correct results.

Reinforcement learning involves machine learning algorithm(s) 220 receiving a reward signal regarding a prior inference, where the reward signal can be a numerical value. During reinforcement learning, machine learning algorithm(s) 220 can output an inference and receive a reward signal in response, where machine learning algorithm(s) 220 are configured to try to maximize the numerical value of the reward signal. In some examples, reinforcement learning also utilizes a value function that provides a numerical value representing an expected total of the numerical values provided by the reward signal over time. In some examples, machine learning algorithm(s) 220 and/or trained machine learning model(s) 232 can be trained using other machine learning techniques, including but not limited to, incremental learning and curriculum learning.

In some examples, machine learning algorithm(s) 220 and/or trained machine learning model(s) 232 can use transfer learning techniques. For example, transfer learning techniques can involve trained machine learning model(s) 232 being pre-trained on one set of data and additionally trained using training data 210.

During inference phase 204, trained machine learning model(s) 232 can receive input data 230 and generate and output one or more corresponding inferences and/or predictions 250 about input data 230. As such, input data 230 can be used as an input to trained machine learning model(s) 232 for providing corresponding inference(s) and/or prediction(s) 250. For example, trained machine learning model(s) 232 can generate inference(s) and/or prediction(s) 250 in response to one or more inference/prediction requests 240.

IV. Example Task Performance System

Figure 3:
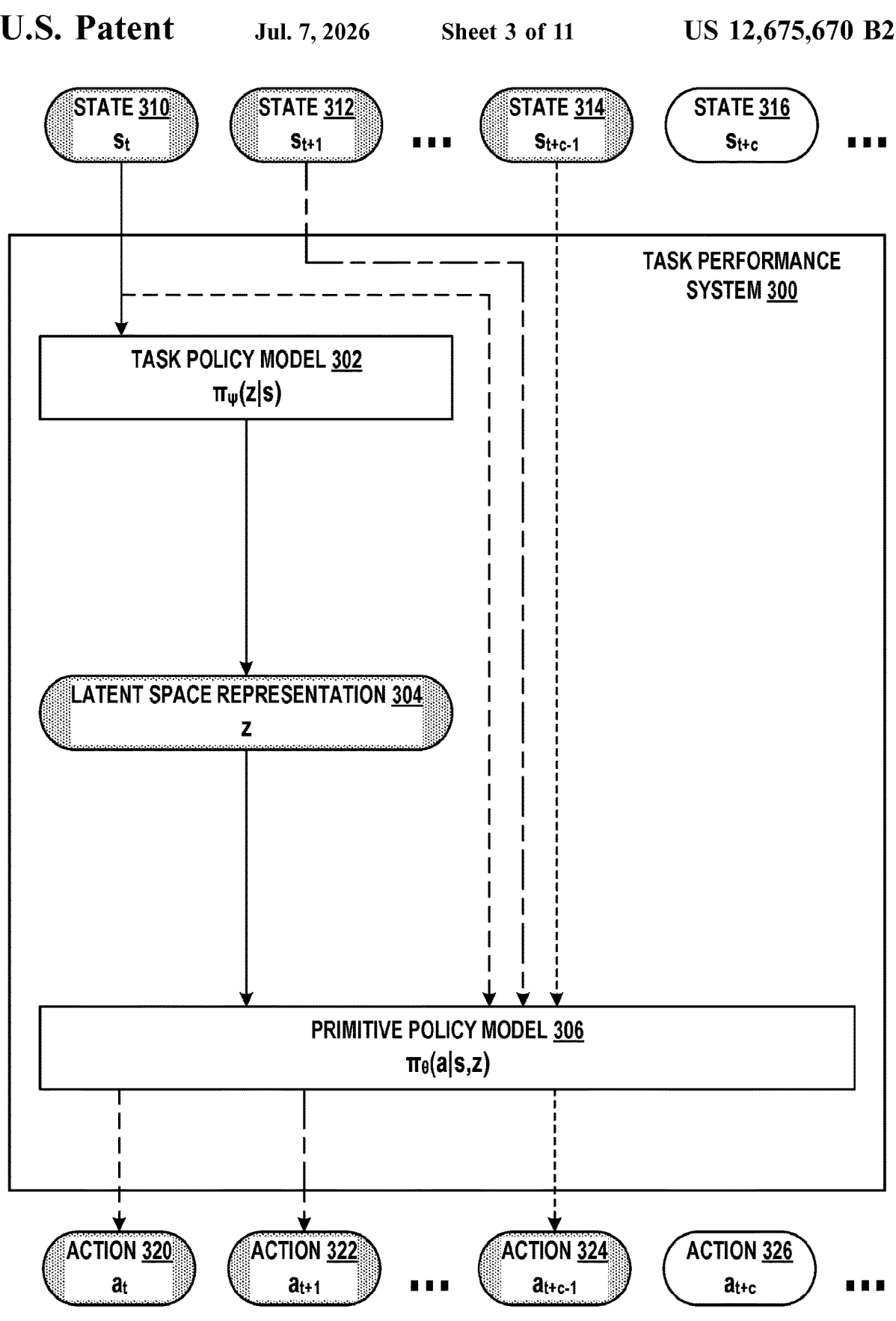
FIG. 3 shows a task performance system, in accordance with examples described herein.

FIG. 3 illustrates an example task performance system 300. Specifically, task performance system 300 may include task policy model 302 and primitive policy model 306. Task performance system 300 may represent the inference phase of the techniques and architectures discussed herein. Task performance system 300 may be configured to generate actions 320, 322 through 324, and 326 (i.e., actions 320-326) based on states 310, 312 through 314, and 316 (i.e., states 310-316), respectively. Task performance system 300 may thus operate as a controller for an agent that moves through various states by taking actions generated by task performance system 300.

Each of states 310-316 may represent a corresponding configuration of the agent in an environment, while actions 320-326 may represent operations that are performable by the agent to transition between different states in the environment. The agent and/or the environment may be physical and/or simulated. In one example, the agent may be a robotic system, the configurations thereof represented by states 310-316 may correspond to different poses of the robotic system relative to an environment, and actions 320-326 may represent movements of different components of the robotic system (e.g., intended to manipulate aspects of the environment). In another example, the agent may be a software process, the configurations thereof represented by states 310-316 may correspond to different combinations of input values, output values, and/or intermediate values of the software process, and actions 320-326 may represent different operations (e.g., mathematical transformations) applied to one or more of these values.

Action 320 executed in state 310 may result in a transition to state 312. Similarly, action 322 executed in state 312 may result in a transition to a subsequent state (not shown, but indicated by the ellipsis). Action 324 executed in state 314 may result in a transition to state 316, and so on. In general, states 310-316 and actions 320-326 may represent aspects of any agents and/or environments that are representable as a Markov decision process (MDP). In some implementations, the MDP may additionally or alternatively include observations corresponding to states 310-316.

Task policy model 302 may be configured to generate latent space representation 304 based on state 310. Task policy model 302 may be viewed as a high-level controller of the agent. Primitive policy model 306 may be configured to use latent space representation 304 and states 310-314 to determine corresponding actions 320-324, respectively. Primitive policy model 306 may be viewed as a low-level controller of the agent. Task policy model 302 and primitive policy model 306 may have been trained with respect to a particular task using a dataset that represents states and actions of the particular task. Primitive policy model 306 and/or task policy model 302 may include and/or be implemented as a feed-forward neural network, although other implementations are possible. Task policy model 302 may be represented by the function $\pi_{\psi}(z|s)$, which may be configured to accept a state as input and generate a latent space representation as output. Primitive policy model 306 may be represented by the function $\pi_{\theta}(a|s,z)$, which may be configured to accept a state and a latent space representation as input and generate an action as output.

Latent space representation 304 may be a vector having a plurality of latent space values (e.g., 8 values), and may represent behaviors that are possible, performable, safe, and/or natural as part of one or more states of the particular task. By basing actions 320-324 on latent space representation 304, primitive policy model 306 may be able to generate actions that stay close to the training data distribution for the particular task, and the agent may thereby avoid moving into states that task performance system 300 has not been trained to handle effectively. Accordingly, usage of latent space representation 304 may improve the stability of task performance system 300 and the corresponding agent, resulting in improved performance of the particular task and increased safety while performing the particular task. Specifically, by avoiding moving into states that task performance system 300 has not been trained to handle effectively, operation of the agent controlled by task performance system 300 may be safer in that the agent is likely to avoid undesirable and/or unsafe behaviors.

Specifically, task policy model 302 may be configured to generate latent space representation 304 to be used for a predetermined number of time steps of the particular task, which may be denoted as c time steps (e.g., c=8 or c=10). Thus, task policy model 302 may determine a corresponding latent space representation based on, for example, the state at t=0, t=c, t=2c, t=3c, and so on. Accordingly, a fill pattern is used to indicate that latent space representation 304 corresponds to states 310-314 and actions 320-324 associated with time steps t through (t+c−1). Task policy model 302 may be configured to determine another instance of latent space representation 304 based on state 316 to be used for determining c actions following state 316.

Primitive policy model 306 may be configured to generate a corresponding action at each time step based on the current state and the corresponding latent space representation. For example, primitive policy model 306 may be configured to generate (i) action 320 based on latent space representation 304 and state 310, (ii) action 322 based on latent space representation 304 and state 312, and (iii) action 324 based on latent space representation 304 and state 314. Primitive policy model 306 may be configured to generate action 326 based on state 316 and a latent space representation of state 316. This operational pattern may be repeated by task performance system 300 for the duration of the particular task. This arrangement is which task policy model 302 generates a latent space representation every c time steps, and primitive policy model 306 generates an action for every time step, provides a temporal extension that accounts for at least part of the improvement in performance relative to other RL methods.

The outputs of the models discussed herein may, in some implementations, be represented as parameters (e.g., mean and standard deviation) of a statistical distribution from which the outputs may be sampled. For example, rather than generating latent space representation 304 explicitly, task policy model 302 may instead generate parameters (e.g., mean and standard deviation) of a latent space statistical distribution from which latent space representation 304 may be sampled. In another example, rather than generating actions 320-326 explicitly, primitive policy model 306 may instead generate parameters (e.g., mean and standard deviation) of an action statistical distributions from which actions 320-326 may be sampled. Nonetheless, one or more of the models discussed herein may be implemented to generate the corresponding output(s) explicitly, rather than generating parameters of a statistical distribution from which the output(s) may be sampled.

V. Example Training Operations and RL Systems

Figure 4:
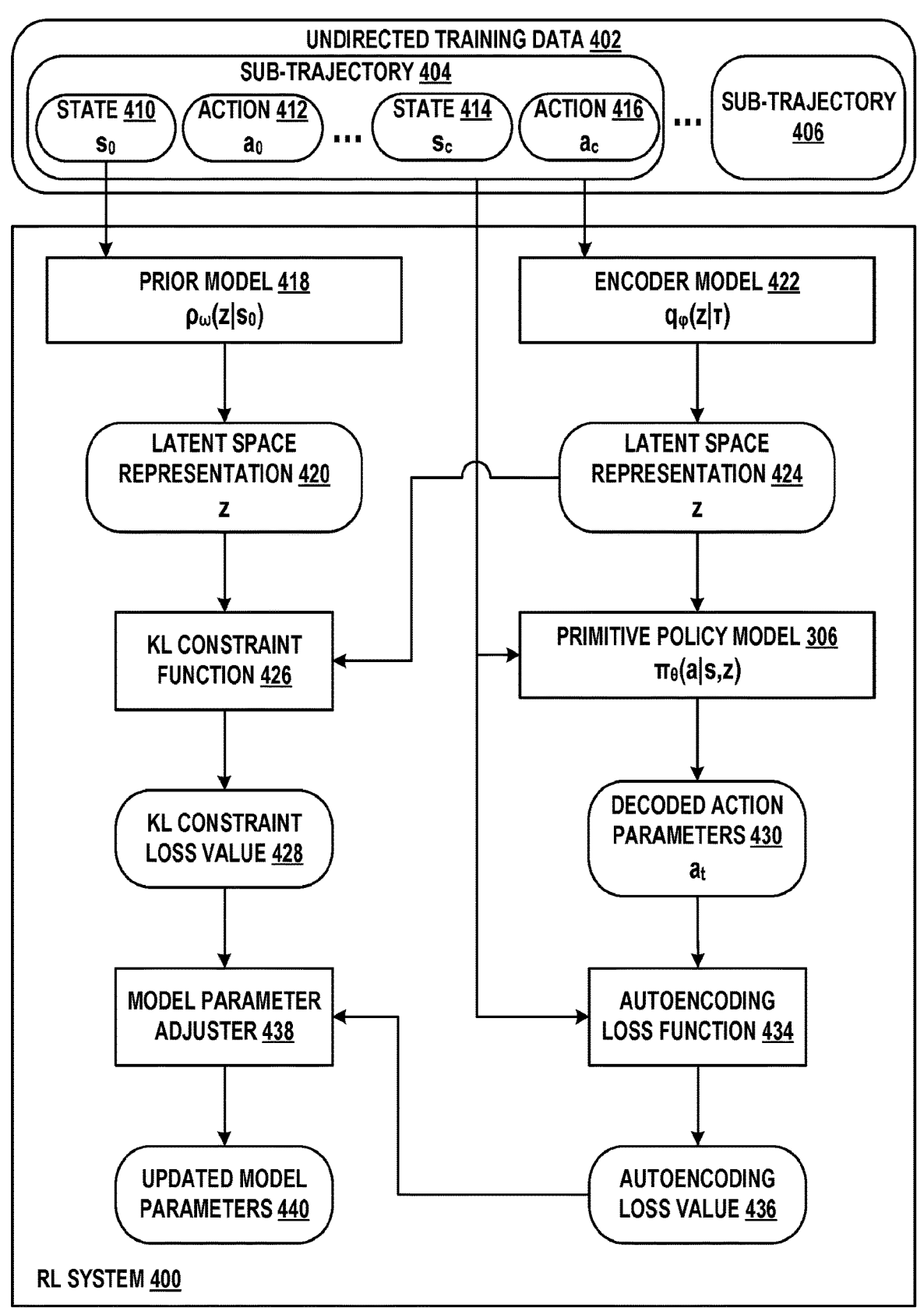
FIG. 4 shows an RL system, in accordance with examples described herein.
Figure 5A:
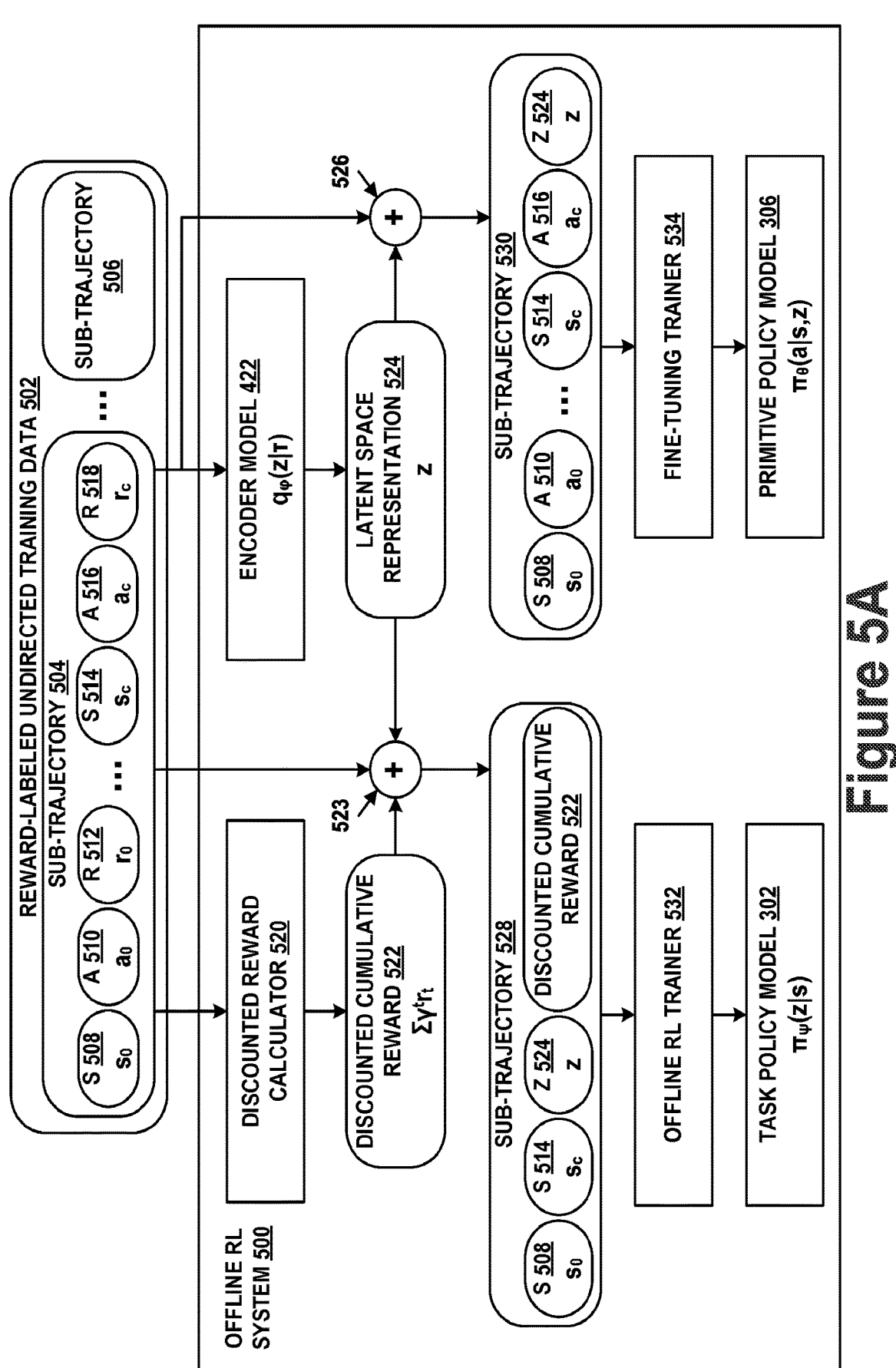
FIG. 5A shows an offline RL system, in accordance with examples described herein.
Figure 5B:
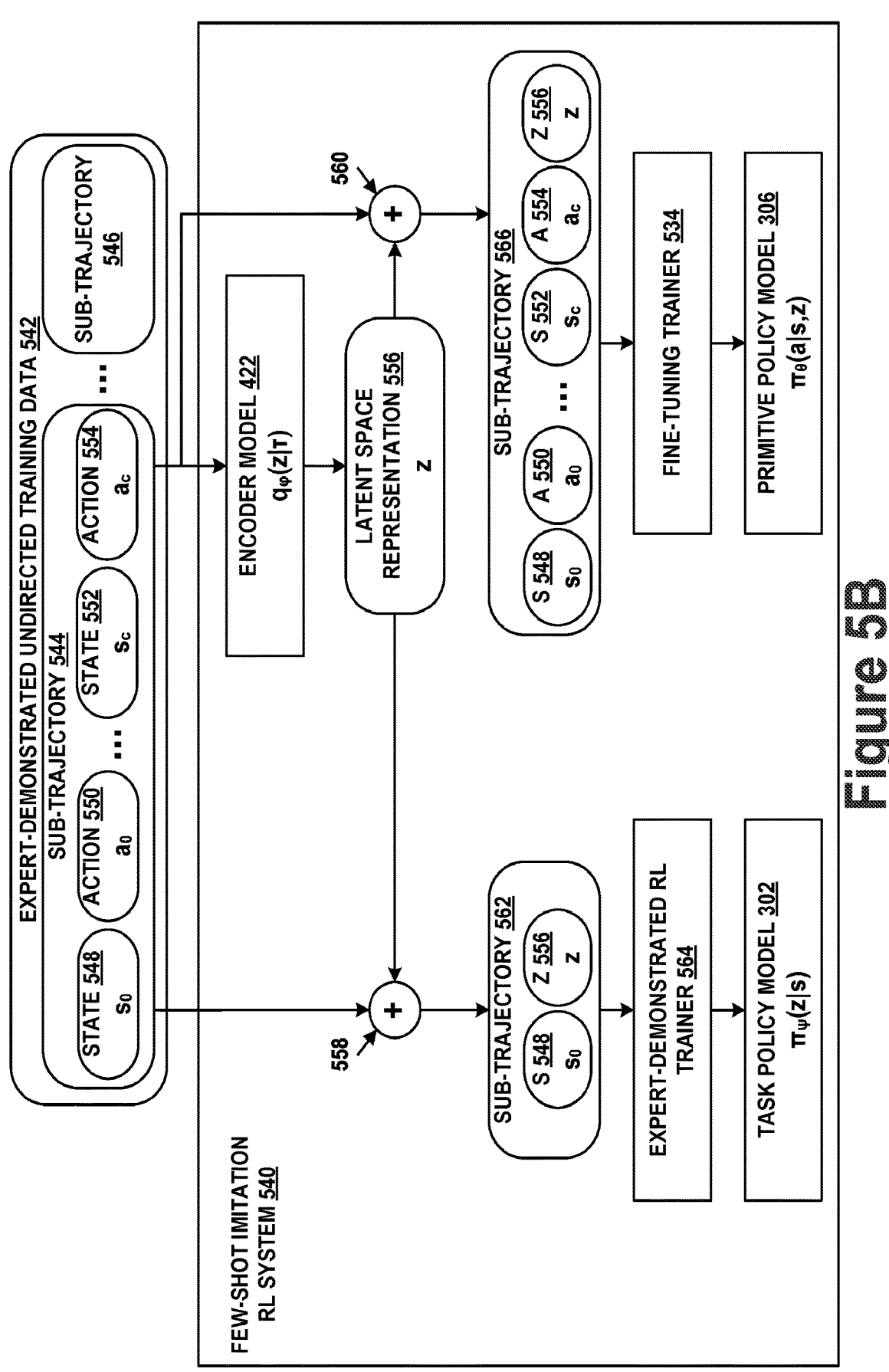
FIG. 5B shows a few-shot imitation RL system, in accordance with examples described herein.
Figure 5C:
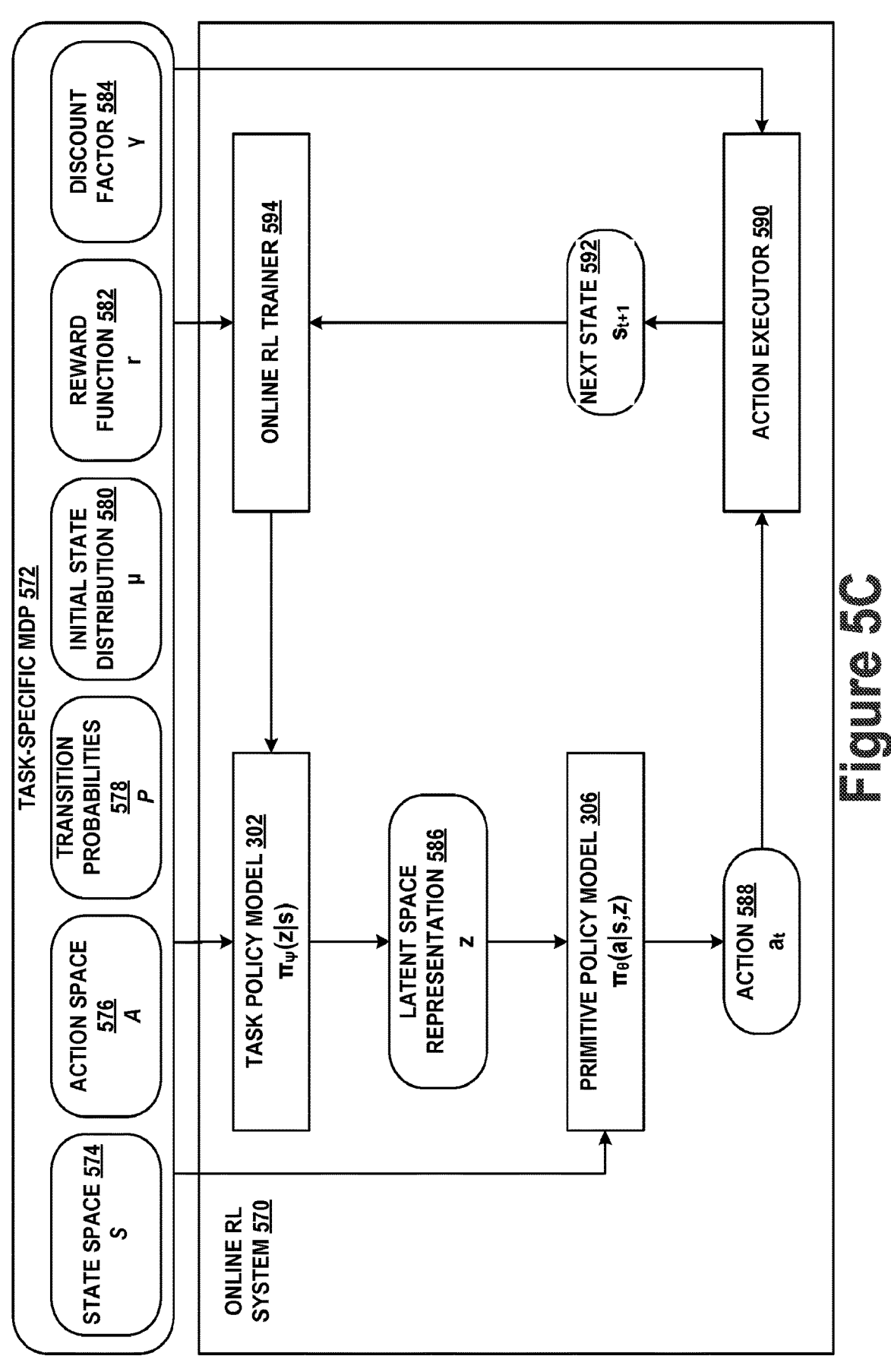
FIG. 5C shows an online RL system, in accordance with examples described herein.

FIGS. 4, 5A, 5B, and 5C illustrate example RL training systems that may be used to train the components of task performance system 300 to perform a particular task. Specifically, FIG. 4 illustrates RL system 400, which may be used to train encoder model 422, prior model 418, and primitive policy model 306. Encoder model 422, prior model 418, and/or primitive policy model 306 may be used by additional RL training systems, as illustrated by FIGS. 5A, 5B, and 5C, to train task policy model 302 and, in some cases, further fine-tune primitive policy model 306.

A. Initial Training to Extract Temporally-Extended Primitives

RL system 400 may include prior model 418, encoder model 422, primitive policy model 306, Kullback-Leibler (KL) constraint function 426, autoencoding loss function 434, and model parameter adjuster 438. RL system 400 may be configured to generate trained versions of prior model 418, encoder model 422, and primitive policy model 306 based on undirected training data 402. Undirected training data 402 may alternatively be referred to as an undirected and/or unlabeled experience dataset.

Undirected training data 402 may include one or more sub-trajectories, each of which may include a predetermined number (e.g., c=10) of state-action pairs that represent behavior of a training agent while performing a training task. Specifically, undirected training data 402 may include sub-trajectory 404 through sub-trajectory 406 (i.e., sub-trajectories 404-406). Sub-trajectory 404 may include state 410 through state 414 (i.e., states 410-414) and corresponding action 412 through action 416 (i.e., actions 412-416). Sub-trajectory 406 may similarly include a corresponding set of state-action pairs (not shown). Sub-trajectories 404-406, as well as other sub-trajectories discussed in other contexts herein, may be represented by the variable $\tau$. Thus, undirected training data 402 may be expressed as $$D = \left\{ \tau_i := \left( s_t^i, a_t^i \right)_{t=0}^{c-1} \right\}_{i=1}^N,$$

where N denotes the number of sub-trajectories each having c state-action pairs.

Undirected training data 402 may represent a training agent performing aspects of a training task in a training environment. The training agent, the training task, and/or the training environment may be similar or identical to the agent, the particular task, and/or the environment, respectively, for which task performance system 300 is deployed at inference time. Thus, undirected training data 402 may contain information about what behaviors are possible, performable, safe, and/or natural as part of the particular task at inference time. Undirected training data 402 may be generated before RL system 400 is used to train models 418, 422, and/or 306. Accordingly, RL system 400 might not be able to cause the training agent to interact with the training environment, but may nevertheless be able to extract useful information from undirected training data 402. Thus, undirected training data 402 may be "undirected" in that RL system 400 might not be able to direct the training agent to perform a target action and/or reach a target state, but the target action and/or target state may nevertheless be represented by undirected training data 402.

Encoder model 422 may be configured to generate latent space representation 424 based on sub-trajectory 404. Encoder model 422 may be represented by the function $q_\phi(z|\tau)$, which may be configured to accept a sub-trajectory as input and generate a latent space representation as output. Encoder model 422 may include and/or be implemented as a bidirectional gated recurrent unit (GRU), although other implementations are possible (e.g., long short-term memory (LSTM) neural network).

Latent space representation 424 may be viewed as a compressed and/or encoded representation of sub-trajectory 404, and may thus be used by primitive policy model 306 to decode and/or reconstruct the actions of sub-trajectory 404. Specifically, primitive policy model 306 may be configured to generate, for a given time step t, decoded action parameters 430 of action $\alpha_t$ in sub-trajectory 404 based on (i) a corresponding state $s_t$ in sub-trajectory 404 and (ii) latent space representation 424 of sub-trajectory 404. For example, action parameters 430 of action $\alpha_0$ in sub-trajectory 404 may be based on (i) state $s_0$ in sub-trajectory 404 and (ii) latent space representation 424 of sub-trajectory 404. Decoded action parameters 430 may include, for example, a mean and standard deviation of a Gaussian distribution from which action $\alpha_t$ may be sampled.

Latent space representation 424 may be similar to latent space representation 304 in that each may be expressed as a vector having a corresponding plurality of latent space values. Latent space representation 424 may be based on c state-action pairs of sub-trajectory 404 as a whole, while latent space representation 304 may be based on one state of a state-action trajectory (and may thereby attempt to represent the state-action trajectory in the latent space).

Prior model 418 may be configured to generate latent space representation 420 based on state 410, which may be expressed as $s_0$ (i.e., the first ordinal state in sub-trajectory 404), but latent space representation 420 might not be based on other states of sub-trajectory 404. That is, prior model 418 may attempt to predict the latent space representation of sub-trajectory 404 based on state 410, and latent space representation 410 may be similar to latent space representation 304 in this regard. Prior model 418 may be represented by the function $\rho_\omega(z|s_0)$, which may be configured to accept a first ordinal state of a given sub-trajectory as input and generate a latent space representation as output. Prior model 418 may include a feed-forward neural network, although other implementations are possible. Latent space representation 420 may be similar to latent space representation 424 in that each may be expressed as a vector having a corresponding plurality of latent space values.

Autoencoding loss function 434 may be configured to quantify an accuracy with which encoder model 422 and primitive policy model 306 are able to reconstruct the actions of sub-trajectory 404. Specifically, autoencoding loss function 434 may be configured to generate autoencoding loss value 436 based on decoded action parameters 430 and sub-trajectory 404. Autoencoding loss function 434 may be expressed as $$L_{AUTOENCODING} = J(\theta, \phi, \omega) = E_{\tau \sim D} E_{z \sim q_\phi(z|\tau)} \left[ -\sum_{t=0}^{c-1} \log(\pi_\theta(a_t \mid s_t, z)) \right],$$

where $E_{\tau \sim D}$ represents the expected value of $\tau$ sampled from D, $E_{z \sim q_\phi(z|\tau)}$ represents the expected value of z sampled from $q_\theta(z|\tau)$, $\pi_\theta(\alpha_t|s_t, z)$ represents decoded action parameters 430 generated by primitive policy model 306 for action at corresponding to state $s_t$ in $\tau$, and $$-\sum_{t=0}^{c-1} \log(\pi_\theta(a_t|s_t, z))$$

represents the conditional log-likelihood of actions in T. Thus, autoencoding loss value 436 may be low when primitive policy model 306 predicts the correction action with high probability, and may be high when primitive policy model 306 predicts the correct action with low probability.

KL constraint function 426 may be configured to quantify a statistical divergence between latent space representations 420 and 424. Specifically, KL constraint function 426 may be configured to generate KL constraint loss value 428 based on latent space representation 420 and latent space representation 424. KL constraint function 426 may be expressed as $L_{KL} = E_{\tau \sim D}[D_{KL}(q_\phi(z|\tau) \| \rho_\omega(z|s_0))]$, where $D_{KL}$ is the Kullback-Leibler divergence (which may alternatively be referred to as relative entropy). Thus, KL constraint loss value 428 may be low when latent space representations 420 and 424 are statistically similar (i.e., have low divergence), and may be high when latent space representations 420 and 424 are statistically dissimilar (i.e., have high divergence).

Model parameter adjuster 438 may be configured to determine updated model parameters 440 based on autoencoding loss value 436 and KL constraint loss value 428 (and possibly other loss values that may be determined by RL system 400). Model parameter adjuster 438 may be configured to determine a total loss value based on a weighted sum of autoencoding loss value 436 and KL constraint loss value 428, which may be expressed as $L_{TOTAL} = L_{AUTOENCODING} + \beta L_{KL}$, where $\beta$ is an adjustable parameter that represents the relative weight of autoencoding loss value 436 and KL constraint loss value 428. In some implementations, KL constraint loss value 428 may be weighted less than autoencoding loss value 436 in determining the total loss value (i.e., $0 < \beta < 1$). Updated model parameters 440 may include one or more updated parameters of encoder model 422, which may be expressed as $\Delta\phi$, one or more updated parameters of prior model 418, which may be expressed as $\Delta\omega$, and/or one or more updated parameters of primitive policy model 306, which may be expressed as $\Delta\theta$.

Basing the total loss on both KL constraint loss value 428 and autoencoding loss value 436, and weighting KL constraint loss value 428 less than autoencoding loss value 436, may encourage RL system 400 to determine a unique latent space representation for each distinct sub-trajectory in undirected training data 402, which may benefit downstream tasks. Thus, primitive policy model 306 may avoid implementing a degenerate space of primitives that would allow primitive policy model 306 to ignore latent space representation 424 when generating decoded action parameters 430 (e.g., in cases where undirected training data 402 can be modeled with a single stationary policy).

Model parameter adjuster 438 may be configured to determine updated model parameters 440 by, for example, determining a gradient of the total loss function $L_{TOTAL}$ Based on this gradient and the total loss value, model parameter adjuster 438 may be configured to select updated model parameters 440 that are expected to reduce the total loss value. After applying updated model parameters 440 to prior model 418, encoder model 422, and/or primitive policy model 306, the operations discussed above may be repeated to compute another instance of the total loss value and, based thereon, another instance of updated model parameters 440 may be determined and applied to models 418, 422, and/or 306 to further improve the performance thereof. Such training of models 418, 422, and/or 306 may be repeated until, for example, the total loss value is reduced to below a target threshold loss value.

B. Offline RL Applications

FIG. 5A illustrates offline RL system 500, which may be configured to perform an offline RL (training) process to generate trained versions of task policy model 302 and primitive policy model 306. Specifically, offline RL system 500 may include discounted reward calculator 520, encoder model 422 as trained by RL system 400, adders 523 and 526, offline RL trainer 532, and fine-tuning trainer 534. Offline RL system 500 may be configured to accept as input reward-labeled undirected training data 502, which may include sub-trajectories 504 through 506 (i.e., sub-trajectories 504-506). Sub-trajectory 504 may include state 508 through state 514 (i.e., states 508-514), corresponding action 510 through action 516 (i.e., actions 510-516), and corresponding reward 512 through reward 518 (i.e., rewards 512-518). Sub-trajectory 506 may similarly include a corresponding set of state-action-reward pairs (not shown). Reward-labeled undirected training data 502 may represent undirected training data 402 where each state has been labeled with a corresponding reward value, and may additionally or alternatively contain state-action trajectories that were not part of undirected training data 402 (with both data 402 and 502 representing the same or similar task). Reward-labeled undirected training data 502 may be expressed as $$D^r = \left\{ \tau_i := \left( s_t^i, a_t^i, r_t^i \right)_{t=0}^{c-1} \right\}_{i=1}^{N}.$$

Encoder model 422 may be configured to generate a corresponding latent space representation for each of sub-trajectories 504-506. For example, encoder model 422 may generate latent space representation 524 based on and corresponding to sub-trajectory 504. Latent space representation 524 may be combined with aspects of sub-trajectory 504, as indicated by adder 526, to generate sub-trajectory 530. Sub-trajectory 530 may include states 508-514, actions 510-516, and latent space representation 524. Similar latent-labeled sub-trajectories may be generated for every other sub-trajectory in reward-labeled undirected training data 502, thereby generating a training data set $$D_{lo}^r = \left\{ \tau_i := \left( \left( s_t^i, a_t^i \right)_{t=0}^{c-1}, z_i \right) \right\}_{i=1}^{N},$$

where the subscript "lo" indicates that this training data set is used for further training of primitive policy model 306 (i.e., the low-level controller).

Training data set $$D_{lo}^r$$

may be used by fine-tuning trainer 534 to fine tune primitive policy model 306, which may allow the c-step transitions to remain consistent with their corresponding latent space representations. For example, fine-tuning trainer 534 may be configured to update the parameters of primitive policy model 306 (after primitive policy model 306 has been trained using RL system 400) using behavior cloning. Thus, fine-tuning trainer 534 may be configured to update parameters of primitive policy model 306 to reduce or minimize a value of a behavior cloning loss function, which may be expressed as $$L_{BC} = \sum_{(\tau,z)\sim D_{lo}^r} \left[ -\sum_{t=0}^{c-1} \log(\pi_\theta(a_t|s_t, z)) \right].$$

Discounted reward calculator 520 may be configured to determine a corresponding discounted cumulative reward for each of sub-trajectories 504-506. Discounted reward calculator 520 may implement the function $$\sum_{t=0}^{c-1} \gamma^t r_t^i.$$

For example, discounted reward calculator 520 may determine discounted cumulative reward 522 based on and corresponding to sub-trajectory 504. Discounted cumulative reward 522 and latent space representation 524 may be combined with aspects of sub-trajectory 504, as indicated by adder 523, to generate sub-trajectory 528. Sub-trajectory 528 may include state 508 (first ordinal state of sub-trajectory 504), state 514 (last ordinal state of sub-trajectory 504), latent space representation 524, and discounted cumulative reward 522. Similar sub-trajectories may be generated for every other sub-trajectory in reward-labeled undirected training data 502, thereby generating a training data set $$D_{hi}^r = \left\{ \tau_i := \left( s_0^i, z_i, s_c^i, \sum_{t=0}^{c-1} \gamma^t r_t^i \right) \right\}_{i=1}^{N},$$

where the subscript "hi" indicates that this training data set is used for training of task policy model 302 (i.e., the high-level controller).

Training data set $$D_{hi}^r$$

may be used by offline trainer 532 to train task policy model 302. For example, offline trainer 532 may be configured to update the parameters of task policy model 302 using Conservative Q-Learning (CQL), as detailed in a paper titled "Conservative Q-Learning for Offline Reinforcement Learning," authored by Kumar et al., and published as arXiv: 2006.04779v3. Alternatively, other offline RL algorithms may be used to train task policy model 302 based on training data set $$D_{hi}^r.$$

Thus, task policy model 302 may be trained to generate latent space representations of states, while primitive policy model 306 may be configured to use these latent space representations to generate corresponding actions.

C. Few-Shot Imitation RL Applications

FIG. 5B illustrates few-shot imitation RL system 540, which may be configured to perform an few-shot imitation RL (training) process to generate trained versions of task policy model 302 and primitive policy model 306. Specifically, few-shot imitation RL system 540 may include encoder model 422 as trained by RL system 400, adders 558 and 560, expert-demonstrated RL trainer 564, and fine-tuning trainer 534. Few-shot imitation RL system 540 may be configured to accept as input expert-demonstrated undirected training data 542, which may be based on a plurality of expert demonstrations of the corresponding task. The expert demonstrations may be expressed as $$D^{exp} = \left\{ \tau_i := (s_t, a_t)_{t=0}^{T-1} \right\}_{i=1}^n,$$

where n<<N.

Expert-demonstrated undirected training data 542 may be partitioned into sub-trajectories 544 through 546 (i.e., sub-trajectories 544-546), each having c state-action pairs, and expert-demonstrated undirected training data 542 may thus be expressed as $$D_{par}^{exp} = \left\{ \tau_{i,k} := (s_{k+t}, a_{k+t})_{t=0}^{c-1} \text{ for } k = 0, \ldots, T-c \right\}_{i=1}^n.$$

Each of sub-trajectories 544-546 may represent part of a stochastically-sampled expert demonstration of how to perform the corresponding task. That is, each of sub-trajectories 544-546 may represent a correct and/or near-optimal manner of performing at least part of the corresponding task, and may thus be assumed to lead to high-reward states. Sub-trajectory 544 may include state 548 through state 552 (i.e., states 548-552) and corresponding action 550 through action 554 (i.e., actions 550-554). Sub-trajectory 546 may similarly include a corresponding set of expert-demonstrated state-action pairs (not shown). Expert-demonstrated undirected training data 542 may represent the same or similar task as undirected training data 402, but the sub-trajectories thereof may be different.

Encoder model 422 may be configured to generate a corresponding latent space representation for each of sub-trajectories 544-546. For example, encoder model 422 may generate latent space representation 556 based on and corresponding to sub-trajectory 544. Latent space representation 556 may be combined with aspects of sub-trajectory 544, as indicated by adder 560, to generate sub-trajectory 566. Sub-trajectory 566 may include states 548-552, actions 550-554, and latent space representation 556. Similar sub-trajectories may be generated for every other sub-trajectory in expert-demonstrated undirected training data 542, thereby generating a training data set $$D_{lo}^{exp} = \left\{ \tau_{i,k} := \left( z_{i,k}, (s_{k+t}^i, a_{k+t}^i)_{t=0}^{c-1} \right) \text{ for } k = 0, \ldots, T-c \right\}_{i=1}^n.$$

Training data set $$D_{lo}^{exp}$$

may be used by fine-tuning trainer 534 to fine tune primitive policy model 306 using, for example, behavioral cloning, as discussed above with respect to FIG. 5A.

Adder 558 may be configured to combine latent space representation 556 with aspects of sub-trajectory 544 to generate sub-trajectory 562. Sub-trajectory 562 may include state 548 (first ordinal state of sub-trajectory 544) and latent space representation 556. Similar sub-trajectories may be generated for every other sub-trajectory in expert-demonstrated undirected training data 542, thereby generating a training data set $$D_{hi}^{exp} = \left\{ \tau_{ik} := (z_{i,k}, s_k^i) \text{ for } k = 0, \ldots, T-c \right\}_{i=1}^n.$$

Training data set $$D_{hi}^{exp}$$

may be used by expert-demonstrated RL trainer 564 to train task policy model 302. For example, expert-demonstrated RL trainer 564 may be configured to update the parameters of task policy model 302 using behavioral cloning. Alternatively, other few-shot imitation learning algorithms may be used to train task policy model 302 based on training data set $$D_{hi}^{exp}.$$

Thus, task policy model 302 may be trained to generate latent space representations of states, while primitive policy model 306 may be configured to use these latent space representations to generate corresponding actions.

D. Online RL Applications

FIG. 5C illustrates online RL system 570, which may be configured to perform an online RL training process to generate a trained version of task policy model 302. Specifically, online RL system 570 may include task policy model 302, primitive policy model 306 as trained by RL system 400, action executor 590, and online RL trainer 594. Online RL system 570 may be configured to cause an agent to perform at least parts of the training task, which may be modeled by task-specific MDP 572. That is, online RL system 570 may be configured to control the agent (e.g., substantially in real time) to sample task-specific MDP 572 and thereby explore the rewards offered by different series of states and/or actions.

Task-specific MDP 572 may include state space 574, action space 576, transition probabilities 578, initial state distribution 580, reward function 582, and discount factor 584. State space 574 may represent the states that are achievable as part of the task represented by task-specific MDP 572. Action space 576 may represent the actions that are performable as part of the task. Transition probabilities 578 may represent the dynamics of task-specific MDP 572. That is, transition probabilities 578 may represent, for each respective state of state space 574, a likelihood that a given action of action space 576 will result in the agent reaching the respective state from each possible preceding state. Initial state distribution 580 may represent a starting point, or a first ordinal state, of the agent as part of task-specific MDP 572. Reward function 582 may indicate a reward associated with each state in state space 574. Discount factor 584 may indicate a rate at which the rewards of reward function 582 decay over time.

Task policy model 302 may be configured to generate latent space representation 586 every c time steps based on the state sampled by the agent from MDP 572 at time nc, n=0, 1, 2, 3, . . . . For example, task policy model 302 may generate a first instance of latent space representation 586 based on and corresponding to initial state distribution 580. Primitive policy model 306 may be configured to determine action 588 (i.e., $a_t$) based on latent space representation 586 and a corresponding state (i.e., $s_t$) of state space 574. Action 588 may be provided to action executor 590, which may be configured to cause the agent to execute action 588. Execution of action 588 may cause the agent to reach next state 592 (i.e., $s_{t+1}$) of state space 574.

Online RL trainer 594 may use the rewards associated with the states reached by the agent as a result of iterative execution of action 588 to train task policy model 302. For example, online RL trainer 594 may be configured to update the parameters of task policy model 302 using a Soft Actor Critic (SAC) process, as detailed in a paper titled "Soft Actor-Critic: Off-Policy Maximum Entropy Deep Reinforcement Learning with a Stochastic Actor," authored by Haarnoja et al., and published as arXiv:1801.01290.

In some implementations, online RL trainer 594 may train task policy model 302 additionally based on a KL divergence between (i) latent space representation 586 and (ii) a corresponding latent state representation generated by prior model 418 based on the state reached every c time steps. That is, online RL trainer 594 may implement the function $L_{KL\,ONLINE}=D_{KL}(\pi_\psi(z|s)\|\rho_\omega(z|s_0))]$, which may be added as a penalty to the loss function implemented by online RL trainer 594. Training task policy model 302 in this way may allow task policy model 302 to generate latent space representation 586 that remains close to the training data distribution, and avoid generalization issues caused by fixing the parameters of primitive policy model 306. Alternatively, other online RL algorithms may be used to train task policy model 302 based on samples from task-specific MDP 572.

VI. Additional Example Operations

FIG. 6 illustrates a flow chart of operations related to performing a task using a task policy model and a primitive policy model. The operations may be carried out by robotic system 100 and/or trained machine learning model(s) 232, among other possibilities. The embodiments of FIG. 6 may be simplified by the removal of any one or more of the features shown therein. Further, these embodiments may be combined with features, aspects, and/or implementations of any of the previous figures or otherwise described herein.

Block 600 may involve determining a first state associated with a particular task.

Block 602 may involve determining, by a task policy model, a latent space representation of the first state. The task policy model may have been trained to define, for each respective state of a plurality of possible states associated with the particular task, a corresponding latent space representation of the respective state. For example, the task policy model may implement and/or be represented by the function $\pi_\psi(z|s)$.

Block 604 may involve determining, by a primitive policy model and based on (i) the first state and (ii) the latent space representation of the first state, an action to take as part of the particular task. The primitive policy model may have been trained to define a space of primitive policies for the plurality of possible states associated with the particular task and a plurality of possible latent space representations. For example, the primitive policy model may implement and/or be represented by the function $\pi_\theta(a|s, z)$. The primitive policy model and/or aspects thereof may be alternatively referred to herein as a decoder, a latent-conditioned policy, and/or an intent driven policy.

Block 606 may involve executing the action to reach a second state associated with the particular task.

In some embodiments, the primitive policy model may be configured to determine, based on (i) the second state and (ii) the latent space representation of the first state, a second action to take as part of the particular task. The second action may be executed to reach a third state associated with the particular task.

In some embodiments, the first state, the action, and the second state may form part of a Markov decision process (MDP) representing the particular task.

In some embodiments, the particular task may represent at least one of: (i) an operation of a robotic device, (ii) an operation of an autonomous vehicle, and/or (iii) an operation of a software agent (e.g., operating as part of a recommendation system).

In some embodiments, the first state and the second state may correspond to physical positions of one or more components of an autonomous device performing the particular task.

In some embodiments, a state trajectory that includes a plurality of states connected by a corresponding plurality of actions may be determined. The plurality of states may include c states. The plurality of actions may include c actions. Determining the state trajectory may include determining, by the primitive policy model, for each respective state of the c states, and based on the respective state and the latent space representation of the first state, a subsequent action of the c actions to take as part of the particular task. The first state and the second state may form part of the c states. For each respective state of the c states, the subsequent action may be executed to reach a subsequent state of the c states.

In some embodiments, determining the state trajectory may include determining a plurality of state trajectories each including a corresponding plurality of states connected by a corresponding plurality of actions. The task policy model may be configured to determine a respective latent space representation of a respective first state of each respective state trajectory of the plurality of state trajectories. The primitive policy model may be configured to use the respective latent space representation to determine each of the corresponding plurality of actions of the respective state trajectory. Thus, the primitive policy model may be used with respect to each of the plurality of states of each of the plurality of trajectories, while the task policy model may be used once per c states.

In some embodiments, the particular task may form part of one or more of: (i) an offline reinforcement learning process, where executing the action may include simulating the action, (ii) a few-shot imitation learning process, where executing the action may include simulating the action, and/or (iii) an online reinforcement learning process, where executing the action may include causing an agent to carry out the action. Thus, execution of the action generated by the primitive policy model may be performed in simulation by a simulated version of a physical agent and/or by commanding a physical agent to execute the action in the real world.

In some embodiments, the space of primitive policies may be continuous and temporally-extended.

In some embodiments, training of the primitive policy model may include determining an undirected experience dataset (e.g., undirected training data 402) that includes one or more sub-trajectories each representing a corresponding transition through a corresponding plurality of states of a training task. An encoder model may be used to determine, for each respective sub-trajectory of the one or more sub-trajectories, one or more parameters of a corresponding latent space distribution. The primitive policy model may be used to determine, based on the one or more parameters of the corresponding latent space distribution, and for each respective state of the corresponding plurality of states of the respective sub-trajectory, one or more parameters of a corresponding distribution of actions associated with the respective state. A loss value may be determined using a loss function based on the one or more parameters of the corresponding distribution of the action associated with each respective state of the corresponding plurality of states of the respective sub-trajectory. The primitive policy model and/or the encoder model may be updated (by updating one or more parameter values thereof) based on the loss value and the loss function. For example, the encoder model may implement and/or be represented by the function $q_\phi(z|\tau)$. The encoder model and/or aspects thereof may be alternatively referred to herein as an encoder and/or an intent recognizer.

In some embodiments, the undirected experience dataset may be (i) generated prior to training of the primitive policy model, (ii) collected by an unknown agent, and/or (iii) unlabeled with corresponding reward and/or task information. The corresponding plurality of states may include c states.

In some embodiments, the corresponding transition of each respective sub-trajectory of the one or more sub-trajectories may include a corresponding plurality of actions connecting the corresponding plurality of states. The encoder model may be configured to determine the one or more parameters of the corresponding latent space distribution based on the corresponding plurality of actions and the corresponding plurality of states. The primitive policy model may be configured to determine the one or more parameters of the corresponding distribution of actions associated with the respective state further based on the respective state.

In some embodiments, the encoder model may include a gated recurrent unit (GRU).

In some embodiments, the primitive policy model may include a feed forward artificial neural network (FF-ANN) arranged to operate as a decoder.

In some embodiments, training of the primitive policy model may include generating, by a prior model and for each respective sub-trajectory of the one or more sub-trajectories, second one or more parameters of the corresponding latent space distribution based on an initial state associated with the respective sub-trajectory. The loss value may be determined using the loss function further based on a comparison of (i) the one or more parameters of the corresponding latent space distribution determined by the encoder model and (ii) the second one or more parameters of the corresponding latent space distribution determined by the prior model. For example, the prior model may implement and/or be represented by the function $\rho_\omega(z|s_0)$.

In some embodiments, the loss function may include an auto-encoding loss function configured to evaluate the one or more parameters of the corresponding distribution of the actions associated with the respective state and a Kullback-Leibler (KL) constraint configured to perform the comparison of (i) the one or more parameters of the corresponding latent space distribution determined by the encoder model and (ii) the second one or more parameters of the corresponding latent space distribution determined by the prior model.

In some embodiments, the loss function may include a weighted sum of (i) the auto-encoding loss function and (ii) the Kullback-Leibler constraint.

In some embodiments, the prior model may include a feed forward artificial neural network (FF-ANN).

In some embodiments, the space of primitive policies may represent actions that, based on the undirected experience dataset, are possible to execute as part of the particular task.

In some embodiments, the task policy model may have been trained as part of an offline reinforcement learning process (e.g., using offline RL system 500). Training of the task policy model may include determining a reward-labeled version of the undirected experience dataset comprising one or more reward-labeled sub-trajectories each representing (i) a corresponding transition through a corresponding plurality of states of the training task and (ii) one or more rewards associated with the corresponding transition. The encoder model may determine, for each respective reward-labeled sub-trajectory of the one or more reward-labeled sub-trajectories, a corresponding latent space representation. The task policy model may be trained based on (i) the one or more reward-labeled sub-trajectories and (ii) the corresponding latent space representation of each respective reward-labeled sub-trajectory. For example, the reward-labeled version of the undirected experience dataset may be represented by reward-labeled undirected training data 502.

In some embodiments, training the task policy model may include training the task policy model using a Conservative Q-Learning (CQL) process.

In some embodiments, training the task policy model further may further include updating the primitive policy model based on (i) the one or more reward-labeled sub-trajectories and (ii) the corresponding latent space representation of each respective reward-labeled sub-trajectory. Updating the primitive policy model may involve updating one or more parameters of the primitive policy model.

In some embodiments, the primitive policy model may be updated independently of the one or more rewards associated with the corresponding transition represented by each of the one or more reward-labeled sub-trajectories.

In some embodiments, updating the primitive policy model may include updating the primitive policy model using a behavioral cloning process.

In some embodiments, the task policy model may have been trained as part of a few-shot imitation learning process (e.g., using few-shot imitation RL system 540). Training of the task policy model may include determining an expert-demonstrated experience dataset (e.g., expert-demonstrated undirected training data 542) that includes one or more expert-demonstrated sub-trajectories each representing a corresponding transition through a corresponding plurality of states of the training task. The encoder model may be used to determine, for each respective expert-demonstrated sub-trajectory of the one or more expert-demonstrated sub-trajectories, a corresponding latent space representation. The task policy model may be trained based on (i) the one or more expert-labeled sub-trajectories and (ii) the corresponding latent space representation of each respective expert-labeled sub-trajectory.

In some embodiments, training the task policy model may include training the task policy model using a behavioral cloning process.

In some embodiments, training the task policy model may further include updating the primitive policy model based on (i) the one or more expert-labeled sub-trajectories and (ii) the corresponding latent space representation of each respective expert-labeled sub-trajectory.

In some embodiments, updating the primitive policy model may include updating the primitive policy model using a behavioral cloning process.

In some embodiments, the task policy model may have been trained as part of an online reinforcement learning process (e.g., using online RL system 570). Training of the task policy model may include selecting, by the task policy model, a particular latent space representation to be used for a predetermined number of time steps. The particular latent space representation may correspond to a subset of the space of primitive policies. Training of the task policy model may also include determining, by the primitive policy model based on the particular latent space representation, a plurality of training actions for the predetermined number of time steps, and executing the plurality of training actions to transition through a corresponding plurality of states. The task policy model may be trained using a second loss function based on rewards associated with the corresponding plurality of states.

In some embodiments, selection of the particular latent space representation may be associated with an induced MDP. The induced MDP may include a latent dynamics function (e.g., transition probabilities 578 expressed as a function of the selected latent space representation), a latent reward function (e.g., reward function 582 adjusted based on the predetermined number of time steps), and a latent discount factor (e.g., discount factor 584 adjusted based on the predetermined number of time steps).

In some embodiments, training the task policy model may include training the task policy model using a Soft Actor Critic (SAC) process.

In some embodiments, training the task policy model may further include generating, by the task policy model, third one or more parameters of the particular latent space representation. The prior model may be used to generate, based on an initial state associated with the predetermined number of time steps, fourth one or more parameters of the particular latent space representation. The task policy model may be trained further based on a comparison of (i) the third one or more parameters and (ii) the fourth one or more parameters.

In some embodiments, the comparison of (i) the third one or more parameters and (ii) the fourth one or more parameters may be based on a Kullback-Leibler constraint/divergence.

VII. Example Performance Results

FIGS. 7A, 7B, and 7C include example performance results of the systems and techniques described herein. The "antmaze" and "kitchen" environments for which results are reported are discussed in more detail in a paper titled "D4RL: Datasets for deep data-driven reinforcement learning," authored by Fu et al., and published as arXiv: 2004.07219. In general, the antmaze environment involves navigation of a maze by a simulated ant robot, while the kitchen environment involves a simulated robot arm manipulating kitchen objects in a kitchen environment.

Specifically, FIG. 7A illustrates the performance of task performance system 300 following training of models 302 and 306 using RL system 400 and offline RL system 500, with offline RL trainer 532 utilizing CQL. FIG. 7B illustrates the performance of task performance system 300 following training of models 302 and 306 using RL systems 400 and few-shot imitation RL system 540, with expert-demonstrated RL trainer 564 utilizing behavioral cloning. FIG. 7C illustrates the performance of task performance system 300 following training of models 302 and 306 using RL systems 400 and online RL system 570, with online RL trainer 594 utilizing SAC. Each result is reported as the average success rate (%) over four different seeds. The best result for each environment and training methodology is indicated by way of shading of the corresponding table cell.

Each of FIGS. 7A, 7B, and 7C additionally details the performance of alternative task performance systems trained using alternative RL methods. Specifically, "BC" denotes a system trained using behavioral cloning. "BEAR" denotes a system trained using the techniques discussed in a paper titled "Stabilizing Off-Policy Q-Learning via Bootstrapping Error Reduction," authored by Kumar et al., and published as arXiv:1906.00949. "EMAQ" denotes a system trained using the techniques discussed in a paper titled "EMaQ: Expected-Max Q-Learning Operator for Simple Yet Effective Offline and Online RL," authored by Ghasemipour et al., and published as arXiv:2007.11091. "CQL" denotes a system trained using CQL independently of the techniques discussed herein. "SVAE" denotes a system trained using the techniques discussed in a paper titled "Robust Imitation of Diverse Behaviors," authored by Wang et al., and published as arXiv:1707.02747. "HIRO" denotes a system trained using the techniques discussed in a paper titled "Near-Optimal Representation Learning for Hierarchical Reinforcement Learning," authored by Nachum et al., and published as arXiv:1810.01257. "DDQN+DDCO" denotes a system trained using the techniques discussed in a paper titled "DDCO: Discovery of Deep Continuous Options for Robot Learning from Demonstrations," authored by Krishnan et al., and published as arXiv:1710.05421.

VIII. Conclusion

The present disclosure is not to be limited in terms of the particular embodiments described in this application, which are intended as illustrations of various aspects. Many modifications and variations can be made without departing from its scope, as will be apparent to those skilled in the art. Functionally equivalent methods and apparatuses within the scope of the disclosure, in addition to those described herein, will be apparent to those skilled in the art from the foregoing descriptions. Such modifications and variations are intended to fall within the scope of the appended claims.

The above detailed description describes various features and operations of the disclosed systems, devices, and methods with reference to the accompanying figures. In the figures, similar symbols typically identify similar components, unless context dictates otherwise. The example embodiments described herein and in the figures are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations.

With respect to any or all of the message flow diagrams, scenarios, and flow charts in the figures and as discussed herein, each step, block, and/or communication can represent a processing of information and/or a transmission of information in accordance with example embodiments. Alternative embodiments are included within the scope of these example embodiments. In these alternative embodiments, for example, operations described as steps, blocks, transmissions, communications, requests, responses, and/or messages can be executed out of order from that shown or discussed, including substantially concurrently or in reverse order, depending on the functionality involved. Further, more or fewer blocks and/or operations can be used with any of the message flow diagrams, scenarios, and flow charts discussed herein, and these message flow diagrams, scenarios, and flow charts can be combined with one another, in part or in whole.

A step or block that represents a processing of information may correspond to circuitry that can be configured to perform the specific logical functions of a herein-described method or technique. Alternatively or additionally, a block that represents a processing of information may correspond to a module, a segment, or a portion of program code (including related data). The program code may include one or more instructions executable by a processor for implementing specific logical operations or actions in the method or technique. The program code and/or related data may be stored on any type of computer readable medium such as a storage device including random access memory (RAM), a disk drive, a solid state drive, or another storage medium.

The computer readable medium may also include non-transitory computer readable media such as computer readable media that store data for short periods of time like register memory, processor cache, and RAM. The computer readable media may also include non-transitory computer readable media that store program code and/or data for longer periods of time. Thus, the computer readable media may include secondary or persistent long term storage, like read only memory (ROM), optical or magnetic disks, solid state drives, compact-disc read only memory (CD-ROM), for example. The computer readable media may also be any other volatile or non-volatile storage systems. A computer readable medium may be considered a computer readable storage medium, for example, or a tangible storage device.

Moreover, a step or block that represents one or more information transmissions may correspond to information transmissions between software and/or hardware modules in the same physical device. However, other information transmissions may be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purpose of illustration and are not intended to be limiting, with the true scope being indicated by the following claims.

What is claimed is:

1. A computer-implemented method comprising:

determining a first state associated with a particular task;

determining, by a task policy model, a latent space representation of the first state, wherein the task policy model has been trained to define, for each respective state of a plurality of possible states associated with the particular task, a corresponding latent space representation of the respective state;

determining, by a primitive policy model and based on (i) the first state and (ii) the latent space representation of the first state, an action to take as part of the particular task, wherein the primitive policy model has been trained to define a space of primitive policies for the plurality of possible states associated with the particular task and a plurality of possible latent space representations, and wherein the primitive policy model has been trained by a process comprising:

determining an undirected experience dataset comprising one or more sub-trajectories each representing a corresponding transition through a corresponding plurality of states of a training task;

determining, by an encoder model, for each respective sub-trajectory of the one or more sub-trajectories, one or more parameters of a corresponding latent space distribution; and training the primitive policy model based on the one or more parameters of the corresponding latent space distribution; and executing the action to reach a second state associated with the particular task, wherein the task policy model has been trained as part of an offline reinforcement learning process that comprises:

determining a reward-labeled version of the undirected experience dataset comprising one or more reward-labeled sub-trajectories each representing (i) a corresponding transition through a corresponding plurality of states of the training task and (ii) one or more rewards associated with the corresponding transition;

determining, by the encoder model and for each respective reward-labeled sub-trajectory of the one or more reward-labeled sub-trajectories, a corresponding latent space representation; and training the task policy model based on (i) the one or more reward-labeled sub-trajectories and (ii) the corresponding latent space representation of each respective reward-labeled sub-trajectory.

2. The computer-implemented method of claim 1, further comprising:

determining, by the primitive policy model and based on (i) the second state and (ii) the latent space representation of the first state, a second action to take as part of the particular task; and executing the second action to reach a third state associated with the particular task.

3. The computer-implemented method of claim 1, further comprising:

determining a state trajectory comprising a plurality of states connected by a corresponding plurality of actions, wherein the plurality of states comprises c states, wherein the corresponding plurality of actions comprise c actions, and wherein determining the state trajectory comprises:

determining, by the primitive policy model, for each respective state of the c states, and based on the respective state and the latent space representation of the first state, a subsequent action of the c actions to take as part of the particular task, wherein the first state and the second state form part of the c states; and executing, for each respective state of the c states, the subsequent action to reach a subsequent state of the c states.

4. The computer-implemented method of claim 3, wherein determining the state trajectory comprises:

determining a plurality of state trajectories each comprising a corresponding plurality of states connected by a corresponding plurality of actions, wherein the task policy model is configured to determine a respective latent space representation of a respective first state of each respective state trajectory of the plurality of state trajectories, and wherein the primitive policy model is configured to use the respective latent space representation to determine each of the corresponding plurality of actions of the respective state trajectory.

5. The computer-implemented method of claim 1, wherein the first state, the action, and the second state form part of a Markov decision process (MDP) representing the particular task.

6. The computer-implemented method of claim 1, wherein executing the action comprises one or more of (i) simulating the action or (ii) causing an agent to physically carry out the action.

7. The computer-implemented method of claim 1, wherein the space of primitive policies is continuous and temporally-extended.

8. The computer-implemented method of claim 1, wherein training of the primitive policy model based on the one or more parameters of the corresponding latent space distribution comprises:

determining, by the primitive policy model, based on the one or more parameters of the corresponding latent space distribution, and for each respective state of the corresponding plurality of states of the respective sub-trajectory, one or more parameters of a corresponding distribution of actions associated with the respective state;

determining a loss value using a loss function based on the one or more parameters of the corresponding distribution of the actions associated with each respective state of the corresponding plurality of states of the respective sub-trajectory; and updating the primitive policy model based on the loss value.

9. The computer-implemented method of claim 8, wherein the corresponding transition of each respective sub-trajectory of the one or more sub-trajectories comprises a corresponding plurality of actions connecting the corresponding plurality of states, wherein the encoder model is configured to determine the one or more parameters of the corresponding latent space distribution based on the corresponding plurality of actions and the corresponding plurality of states, and wherein the primitive policy model is configured to determine the one or more parameters of the corresponding distribution of actions associated with the respective state further based on the respective state.

10. The computer-implemented method of claim 8, wherein the process by which the primitive policy model has been trained further comprises:

generating, by a prior model and for each respective sub-trajectory of the one or more sub-trajectories, second one or more parameters of the corresponding latent space distribution based on an initial state associated with the respective sub-trajectory; and determining the loss value using the loss function further based on a comparison of (i) the one or more parameters of the corresponding latent space distribution determined by the encoder model and (ii) the second one or more parameters of the corresponding latent space distribution determined by the prior model.

11. The computer-implemented method of claim 10, wherein the loss function comprises an auto-encoding loss function configured to evaluate the one or more parameters of the corresponding distribution of the actions associated with the respective state and a Kullback-Leibler constraint configured to perform the comparison of (i) the one or more parameters of the corresponding latent space distribution determined by the encoder model and (ii) the second one or more parameters of the corresponding latent space distribution determined by the prior model, and wherein the loss function comprises a weighted sum of the auto-encoding loss function and the Kullback-Leibler constraint.

12. The computer-implemented method of claim 1, wherein the space of primitive policies represents actions that, based on the undirected experience dataset, are possible to execute as part of the particular task.

13. The computer-implemented method of claim 1, wherein the task policy model has been further trained using a Conservative Q-Learning process, wherein the primitive policy model has been updated using a behavioral cloning process based on (i) the one or more reward-labeled sub-trajectories and (ii) the corresponding latent space representation of each respective reward-labeled sub-trajectory, and wherein the primitive policy model is has been updated independently of the one or more rewards associated with the corresponding transition represented by each of the one or more reward-labeled sub-trajectories.

14. The computer-implemented method of claim 1, wherein the task policy model has been trained as part of a few-shot imitation learning process that comprises:

determining an expert-demonstrated experience dataset comprising one or more expert-demonstrated sub-trajectories each representing a corresponding transition through a corresponding plurality of states of the training task;

determining, by the encoder model and for each respective expert-demonstrated sub-trajectory of the one or more expert-demonstrated sub-trajectories, a corresponding latent space representation; and training the task policy model based on (i) the one or more expert-demonstrated sub-trajectories and (ii) the corresponding latent space representation of each respective expert-demonstrated sub-trajectory.

15. The computer-implemented method of claim 14, wherein the task policy model has been trained using a behavioral cloning process, and wherein the primitive policy model has been updated using the behavioral cloning process based on (i) the one or more expert-demonstrated sub-trajectories and (ii) the corresponding latent space representation of each respective expert-demonstrated sub-trajectory.

16. The computer-implemented method of claim 10, wherein the task policy model has been trained as part of an online reinforcement learning process comprising:

selecting, by the task policy model, a particular latent space representation to be used for a predetermined number of time steps;

determining, by the primitive policy model based on the particular latent space representation, a plurality of training actions for the predetermined number of time steps;

executing the plurality of training actions to transition through a corresponding plurality of states; and training the task policy model using a second loss function based on rewards associated with the corresponding plurality of states.

17. The computer-implemented method of claim 16, wherein the task policy model has been further trained by:

training the task policy model using a Soft Actor Critic (SAC) process;

generating, by the task policy model, third one or more parameters of the particular latent space representation;

generating, by the prior model and based on an initial state associated with the predetermined number of time steps, fourth one or more parameters of the particular latent space representation; and training the task policy model further based on a comparison of (i) the third one or more parameters and (ii) the fourth one or more parameters, wherein the comparison of (i) the third one or more parameters and (ii) the fourth one or more parameters is based on a Kullback-Leibler constraint.

18. A system comprising:

a processor; and a non-transitory computer-readable medium having stored thereon instructions that, when executed by the processor, cause the processor to perform operations comprising:

determining a first state associated with a particular task;

determining, by a task policy model, a latent space representation of the first state, wherein the task policy model has been trained to define, for each respective state of a plurality of possible states associated with the particular task, a corresponding latent space representation of the respective state;

determining, by a primitive policy model and based on (i) the first state and (ii) the latent space representation of the first state, an action to take as part of the particular task, wherein the primitive policy model has been trained to define a space of primitive policies for the plurality of possible states associated with the particular task and a plurality of possible latent space representations, and wherein the primitive policy model has been trained by a process comprising:

determining an undirected experience dataset comprising one or more sub-trajectories each representing a corresponding transition through a corresponding plurality of states of a training task;

senting a corresponding transition through a corresponding plurality of states of a training task;

determining, by an encoder model, for each respective sub-trajectory of the one or more sub-trajectories, one or more parameters of a corresponding latent space distribution; and training the primitive policy model based on the one or more parameters of the corresponding latent space distribution; and executing the action to reach a second state associated with the particular task, wherein the task policy model has been trained as part of an offline reinforcement learning process that comprises:

determining a reward-labeled version of the undirected experience dataset comprising one or more reward-labeled sub-trajectories each representing (i) a corresponding transition through a corresponding plurality of states of the training task and (ii) one or more rewards associated with the corresponding transition;

determining, by the encoder model and for each respective reward-labeled sub-trajectory of the one or more reward-labeled sub-trajectories, a corresponding latent space representation; and training the task policy model based on (i) the one or more reward-labeled sub-trajectories and (ii) the corresponding latent space representation of each respective reward-labeled sub-trajectory.

19. The system of claim 18, wherein the operations further comprise:

determining a state trajectory comprising a plurality of states connected by a corresponding plurality of actions, wherein the plurality of states comprises c states, wherein the corresponding plurality of actions comprise c actions, and wherein determining the state trajectory comprises:

determining, by the primitive policy model, for each respective state of the c states, and based on the respective state and the latent space representation of the first state, a subsequent action of the c actions to take as part of the particular task, wherein the first state and the second state form part of the c states; and executing, for each respective state of the c states, the subsequent action to reach a subsequent state of the c states.

20. A non-transitory computer-readable medium having stored thereon instructions that, when executed by a computing device, cause the computing device to perform operations comprising:

determining a first state associated with a particular task;

determining, by a task policy model, a latent space representation of the first state, wherein the task policy model has been trained to define, for each respective state of a plurality of possible states associated with the particular task, a corresponding latent space representation of the respective state;

determining, by a primitive policy model and based on (i) the first state and (ii) the latent space representation of the first state, an action to take as part of the particular task, wherein the primitive policy model has been trained to define a space of primitive policies for the plurality of possible states associated with the particular task and a plurality of possible latent space representations, and wherein the primitive policy model has been trained by a process comprising:

determining an undirected experience dataset comprising one or more sub-trajectories each representing a corresponding transition through a corresponding plurality of states of a training task;

determining, by an encoder model, for each respective sub-trajectory of the one or more sub-trajectories, one or more parameters of a corresponding latent space distribution;

training the primitive policy model based on the one or more parameters of the corresponding latent space distribution; and executing the action to reach a second state associated with the particular task, wherein the task policy model has been trained as part of an offline reinforcement learning process that comprises:

determining a reward-labeled version of the undirected experience dataset comprising one or more reward-labeled sub-trajectories each representing (i) a corresponding transition through a corresponding plurality of states of the training task and (ii) one or more rewards associated with the corresponding transition;

determining, by the encoder model and for each respective reward-labeled sub-trajectory of the one or more reward-labeled sub-trajectories, a corresponding latent space representation; and training the task policy model based on (i) the one or more reward-labeled sub-trajectories and (ii) the corresponding latent space representation of each respective reward-labeled sub-trajectory.

* * * * *